United States Patent [19]

Dalton

[11] 3,928,495

[45] Dec. 23, 1975

[54] CONTINUOUS PROCESS FOR THE PREPARATION OF ABS TYPE POLYBLENDS

[75] Inventor: William O. Dalton, Hampden, Mass.

[73] Assignee: Monsanto Company, St. Louis, Mo.

[22] Filed: Apr. 26, 1974

[21] Appl. No.: 464,426

[52] U.S. Cl............ 260/876 R; 260/45.95; 260/879; 260/880 R
[51] Int. Cl.². C08L 9/02; C08L 9/06; C08L 51/06; C08L 55/02
[58] Field of Search ...................... 260/876 R, 880 R

[56] References Cited
UNITED STATES PATENTS

| | | | |
|---|---|---|---|
| 3,509,238 | 4/1970 | Aubrey et al. | 260/876 R |
| 3,511,895 | 5/1970 | Kydonieus et al. | 260/876 R |
| 3,513,145 | 5/1970 | Crawford | 260/880 |
| 3,576,910 | 4/1971 | Jastrzebski | 260/876 R |
| 3,658,946 | 4/1972 | Bronstert et al. | 260/880 R |
| 3,660,535 | 5/1972 | Finch et al. | 260/880 |
| 3,700,622 | 10/1972 | Terenzi | 260/876 R |

*Primary Examiner*—Murray Tillman
*Assistant Examiner*—Thurman K. Page
*Attorney, Agent, or Firm*—Joseph S. Nelson; Edward P. Grattan; James C. Logomasini

[57] ABSTRACT

This invention relates to a continuous process for the production of ABS type polyblends comprising the polymerization of a monomer composition comprising monoalkenyl aromatic and alkenyl nitrile monomers in a single reaction zone under steady state conditions forming a matrix copolymer dissolved in said monomers as a liquid phase while continuously dispersing in said liquid phase a first and second grafted diene rubber followed by devolatilization of said liquid phase to form an ABS polyblend having a bimodal rubber particle size distribution and a matrix copolymer having a uniform monomer composition and molecular weight distribution.

38 Claims, 4 Drawing Figures

CONTINUOUS PROCESS FOR THE PREPARATION OF ABS TYPE POLYBLENDS

BACKGROUND OF THE INVENTION

As is well known, polyblends of rubber with styrene/acrylonitrile polymers have significant advantages in providing compositions of desirable resistance to impact for many applications. Various processes have been suggested or utilized for the manufacture of such polyblends including emulsion, suspension and mass polymerization techniques, and combinations thereof. Although graft blends of a monoalkenyl aromatic and ethylenically unsaturated nitrile monomers and rubber prepared in mass exhibit desirable properties, this technique has had large scale commercial limitations upon the maximum degree of conversion of monomers to polymer which can be effected because of the high viscosities and accompanying power and equipment requirements, which are encountered when the reactions are carried beyond a fairly low degree of conversion after phase inversion takes place. As a result, techniques have been adopted wherein the initial polymerization is carried out in mass to a point of conversion at which the viscosity levels are still of practical magnitudes, after which the resulting prepolymerization syrup is suspended in water or other inert liquid and polymerization of the monomers carried to substantial completion.

N. E. Aubrey in U.S. Pat. No. 3,509,237 discloses a mass/suspension method of polymerization styrene/acrylonitrile having diene rubbers dissolved therein with the rubber being grafted, inverted and dispersed as rubber particles under agitation. After phase inversion, the viscous mixture is suspended in water and polymerization is completed producing a polyblend in the form of beads.

Such mass/suspension processes are used commercially, however, present the economic problems of batch operations requiring long cycles at relatively low temperatures to control the heat of polymerization. Continuous mass polymerization processes have great economic advantages if they can be run at higher temperatures and higher rates with the necessary control of the great heats of polymerization. In the case of polyblends, the dispersed rubber phase must be formed and stabilized as to its morphology bringing it through the continuous polymerization of the rigid matrix polymer plate so that the physical properties of the polyblend meet exacting property specifications.

N. E. Aubrey in U.S. Pat. No. 3,509,237 further discloses a process for preparing styrene/acrylonitrile/rubber polyblends having a first and second graft rubber phase wherein the first grafted rubber has a large particle size and the second grafted rubber has a smaller particle size. Such polyblends have superior properties if the smaller particle size rubber phase constitutes the largest proportion of the total rubber phase. A process for making such polyblends is disclosed wherein the two grafted rubber polyblends are prepared in batch processes separately and thereafter melt blended mechanically to form a polyblend having a first and second grafted rubber phase.

Kydonieus et.al. discloses in U.S. Pat. No. 3,511,895 a continuous mass polymerization process for styrene-acrylonitrile monomer having a rubber dissolved therein wherein the polymerization is carried out continuously through three zones of polymerization for heat control. A diluent solvent is also used to reduce viscosities for mixing and pumping ease along with polymerization and heat control. Such processes require physically separated reactors providing different reacting conditions for each step of polymerization involving costly multiple reactors and auxiliary equipment. The ABS polyblend produced by the process has only a monomodal size distribution for the dispersed rubber particles which does not provide an optimum balance of toughness and gloss.

Heretofore, in the art of manufacturing ABS polyblends having matrix phase copolymers of monoalkenyl aromatic compounds and lower alkenyl nitrile compounds utilizing continuous mass polymerization, there has been a problem in controlling and achieving heat removal, particularly at higher rates of conversion and higher conversion levels. The problem arises because at high conversions conductive and convective heat transfer rates decline and become insufficient at high conversion rates to achieve uniformity of temperature and conversion throughout a polymerizing mass which is constituted of monomers and polymers (and, possibly, other materials). If the heat transfer rate is not adequate, the conversion rate varies locally in the reaction mass, and consequently, the molecular weight distribution as well as the monomer composition changes in the matrix copolymer being formed. Consequently, in continuous mass polymerization processes known to the prior art, there has tended to be a practical upper limitation both on the percent conversion and on the rate of conversion achievable.

In such prior art processes, it has been conventional heretofore, in order to maintain, generally, uniformity of temperature, conversion and composition, to use a diluent. Diluents, however, suffer from the disadvantage that they must usually be removed from the polymerized product before such product is suitable for most end use purposes. Another disadvantage is that diluents tend to reduce the rate of polymerization (or polyrate), although, with a copolymer type such as styrene/acrylonitrile, theoretical maximum polyrates in mass polymerization are characteristically not achieved because of inherent heat transfer and mixing limitations known equipment. From an efficiency standpoint, diluents can be regarded as materials which reduce the capacity of polymerization equipment in mass polymerization processes.

The present process overcomes the above problem of the prior art processes by providing a process for the continuous polymerization of ABS polyblends in a single reaction zone with excellent heat and compositional control providing uniform products of great commercial utility. A monoalkenyl aromatic and alkenyl nitrile monomer composition having dispersed therein first and second grafted rubber is continuously polymerized under steady state conditions. Vapor removal cooling and uniform mixing in said single reaction zone insures uniform temperatures and composition throughout the polymerizing liquid phase.

By the present invention for the continuous polymerization of ABS polyblends it is possible to achieve simultaneously (1) high rates of monomer to copolymer conversion, (2) a high total conversion of monomers to copoylmer, and (3) a high uniformity of composition in the polymerizing mass of monomers, rubber and copolymer, compared to the known prior art continuous polymerization processes for producing ABS polyblends having matrix copolymers of monoalkenyl aromatic and alkenyl nitrile monomers and containing dispersed crosslinked grafted rubbers. As a result, the polyblend matrix copolymers produced by the process of the present invention characteristically have a substantially constant molecular weight distribution and a substantially constant monomer composition. While ABS polyblends having matrix copolymers of monoalkenyl aromatic compounds and lower alkenyl nitrile compounds with such narrow distribution characteristics have been produced by batch processes, it is believed that such polyblends have never heretofore been produced or producable under steady state conditions using continuous mass polymerization at the conversion levels and rates of conversion achievable by utilizing the principles and practice of the present invention. Diluents may be utilized, but generally are not necessary or desirable in practicing the basis principles of the present invention.

In the practice of the process the present invention, it is possible to employ reflux condensation to control temperature and pressure in the reaction zone at substantially constant values. Indeed, substantially isothermal conditions prevail throughout the reaction zone. So far as can be determined from the prior art, it has never heretofore been possible to employ reflux condensation (or, broadly, vapor removal) in a continuous mass polymerization process for the manufacture of ABS polyblends having matrix copolymers of monoalkenyl aromatic compounds and alkenyl nitrile compounds without adversely broadening either or both the molecular weight distribution and the monomer composition in the resulting ABS polyblends product. Such a broadening of distributions is undesirable, generally speaking, because it reduces physical strength characteristics, increases the haze and the yellowness in the ABS polyblend, and thereby narrows the range of utilities for which the product copolymer is suitable. By the practice of the present invention, however, reflux condensation is used to make ABS polyblends having matrix copolymers having narrow compositional distributions.

In the practice of the process of the present invention, mixing conditions in the reaction zone are employed which maintain the polymerizing liquid phase of such zone during continuous mass polymerization in a substantially homogeneous condition at all times, independent of viscosity of the liquid phase of the reaction system in the reaction zone. Such homogeneity has been exceedingly difficult to attain in the prior art because of the characteristically high viscosities associated with high conversion rates and high conversion levels in polymerizing monoalkenyl aromatic compounds and lower alkenyl nitrile compounds. Even relatively small variations in compositional homogeneity of materials in the reaction zone have been found to adversely affect desired narrow molecular weight distribution and composition distribution in the resulting copolymer product. To gain such compositional homogeneity, in accordance with the practice of the present invention, it has been found preferable to employ a particular type of mixing action, as more particularly hereinafter explained and described. While especially useful with high viscosity reaction systems, this mixing action is suitable generally for the practice of the present invention over wide viscosity ranges.

It is an object of the present invention to provide a continuous mass polymerization process for producing ABS polyblends having matrix copolymers of at least one monoalkenyl aromatic compound and at least one alkenyl nitrile compound and having contained therein dispersed first and second grafted diene rubbers.

It is an object of the present invention to provide a process for producing ABS polyblends having matrix copolymers of monoalkenyl aromatic compounds and alkenyl nitrile compounds which have a substantially constant molecular weight distribution and a substantially constant monomer composition.

It is an object of the present invention to produce ABS polyblends wherein the matrix copolymers are polymerized at high monomer to polymer conversion rates and at high conversion levels.

It is an object of the present invention to produce ABS polyblends polymerized in a single reaction zone with continuous mass polymerization conditions using a substantially uniform composition distribution throughout the reacting mass of monomers and polymers.

It is an object of the present invention to produce ABS polyblends using vapor removal to remove heat of reaction and regulate temperature of such reacting mass.

It is an object of the present invention to utilize a combination of continuous reflux condensation and uniform, complete, continuous mixing in the continuous mass polymerization of ABS polyblends.

It is an object of the present invention to maintain substantially isothermal conditions in the reaction zone of the continuous mass polymerization process for ABS.

It is an object of the present invention to provide a process whereby one can easily and effectively manufacture ABS polyblends having azeotropic or non-azeotropic monoalkenyl aromatic alkenyl nitrile monomer compositions.

It is an object of the present invention to provide a process having a fluid phase containing an ABS polyblend having a low percentage of unreacted monomers and a high percentage of matrix copolymer of alkenyl nitrile and monoalkenyl aromatic monomers and dispersed first and second grafted diene rubbers so as to reduce the cost of removing unreacted monomers from such polyblends during devolatilization.

It is an objective of this invention to provide a process to prepare ABS polyblends of monoalkenyl aromatic and monoalkenyl nitrile copolymers as the rigid matrix phase having dispersed therein first and second grafted diene rubber particles having a biomodal particle size distribution.

SUMMARY OF THE INVENTION

It has not been found that the above and related objectives and advantages may be readily attained in the present invention:

A continuous process for the preparation of an ABS type polyblend, the steps comprising:

A. continuously charging a monomer composition comprising at least one alkenyl nitrile monomer of the formula:

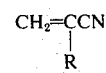

wherein R is selected from the group consisting of hydrogen and alkyl radicals containing from 1 through 4 carbon atoms each and at least one monoalkenyl aromatic monomer of the formula:

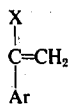

wherein:
Ar is selected from the group consisting of a phenyl radical, an alkaryl radical of 6 through 9 carbon atoms, a monochlorophenyl radical, a dichlorophenyl radical, a monobromophenyl radical, and a dibromophenyl radical, and
X is selected from the group consisting of hydrogen and an alkyl radical containing less than three carbon atoms to a reaction zone,
B. continuously maintaining in said reaction zone a reaction system comprising a liquid phase of said monomers with a vapor phase of said monomers generally thereabove,
 1. said liquid phase filling said reaction zone to an extent of from about 10 to 95 percent by volume and comprising said monomer composition,
 2. said vapor phase filling the balance up to 100 percent by volume of said reaction zone, the exact composition of said vapor phase being in substantial equilibrium with the exact composition of said liquid phase,
C. continuously subjecting said reaction system in said reaction zone to mixing action sufficient to maintain a substantially uniform composition distribution throughout said liquid phase in said reaction zone,
D. continuously polymerizing said monomers at a temperature from about 100° to 180°C. and a pressure of from about 5 to 150 psia forming a matrix copolymer dissolved in said liquid phase,
E. continuously dispersing uniformly a first and second grafted diene rubber into said liquid phase under the mixing action of step (C),
F. continuously removing said vapor phase from said reaction zone at a rate sufficient to maintain, in combination with any heat of reaction being absorbed in said reaction zone by said charging of monomers and with any heat of reaction being removed from said reaction zone through the peripheral boundaries thereof, in said reaction zone a substantially constant temperature and a corresponding substantially constant pressure within the respective temperature and pressure ranges above specified,
G. continuously removing said liquid phase from said reaction zone at a rate sufficient to maintain the above specified volume of said liquid phase,
H. continuously separating said matrix copolymer and said first and second grafted rubbers from said liquid phase removed in step (G) as an ABS polyblend,
I. said charging additionally being conducted;
 1. at a rate substantially equal to the total rate at which monomers are polymerized in said reaction zone, and removed from said reaction zone, and
 2. in a ratio of total alkenyl nitrile monomers to total monoalkenyl aromatic monomers such that both a substantially constant said monomer composition is effectively maintained in said liquid phase in said reaction zone and in said matrix copolymer formed from said monomer composition,
J. the interrelationship between said charging, said liquid phase removal, and said substantially constant temperature and corresponding substantially constant pressure in said reaction zone being such that:
 1. the weight percentate of said matrix copolymer in said liquid phase in said reaction zone is maintained at a substantially predetermined constant value,
 2. the rate at which said matrix copolymer is formed from said monomer composition in said reaction zone ranges from about 0.05 to 2.0 pounds of said matrix copolymer produced per pound of said liquid phase per hour,
K. the interrelationship in said reaction zone between said mixing action and said vapor phase removal being such that said reaction system is maintained under substantially isothermal conditions,
L. the interrelationship between said charging, said vapor phase removal, and said reaction zone being such that:
 1. at least about 10 percent of the heat of reaction is removed from said reaction zone by said vapor phase removal,
 2. up to about 90 percent of the heat of reaction is absorbed by said charging, and
 3. up to about 50 percent of the heat of reaction is removed through the peripheral boundaries of said reaction zone through heat transfers.

DETAILED DESCRIPTION

Said monomer composition is continuously charged to a reaction zone and a reaction system is contunuously maintained in said reaction zone comprising a liquid phase with a vapor phase generally thereabove. Such liquid phase generally fills said reaction zone to an extent of from about 10 to 95 percent by volume and comprises said monomer composition as a solvent. Such vapor phase generally fills the balance up to 100 percent by volume of said reaction zone and comprises said monomer composition, the exact composition of said vapor phase being in substantially equilibrium with the exact composition of said liquid phase. Said reaction system in said reaction zone is continuously subjected to mixing action sufficient to maintain a substantially uniform composition distribution throughout said liquid phase in said reaction zone. One such suitable reaction system is described in the copending application of G. A. Latinen, U.S. Ser. No. 256,660 filed May 25, 1972.

In the present process the monomer composition is continuously polymerized at a temperature of from about 100° to 180°C. and a pressure of from 5 to 150 psia forming a matrix copolymer of said monomers dissolved in said liquid phase while continuously dispersing uniformly a first and second grafted diene rubber into said liquid phase under the mixing action of step (C) so as to provide from about 1 to 40% by weight of said first and second grafted rubbers in said liquid phase. The matrix copolymer formed is characterized by having a weight average molecular weight ranging from 20,000 to 1,000,000, a dispersion index of from about 2.0 to 3.5, a substantially constant molecular weight distribution and a substantially constant monomer composition.

Said vapor phase is continuously removed from said reaction zone. This vapor is removed at a rate sufficient, in combination with any heat of reaction being absorbed in said reaction zone by said charging of said monomer composition, and in combination with any heat of reaction being removed from said reaction zone through peripheral boundaries or walls thereof, to maintain in said reaction zone a substantially constant temperature and a corresponding substantially constant pressure within the respective temperature and pressure ranges above specified.

Additionally, from said reaction zone, one continuously removes said liquid phase from said reaction zone at a rate sufficient to maintain the above specified volume of said liquid phase therein.

The said charging is conducted at a rate substantially equal to the total rate at which monomers are polymerized in said reaction zone and removed from said reaction zone. Additionally, said charging is conducted so that the ratio of total alkenyl nitrile compounds to total monoalkenyl aromatic compounds is such that both substantially constant said monomer composition is effectively maintained in said liquid phase in said reaction zone and the matrix copolymer formed from said monomer composition is dissolved in said liquid phase.

Various of the above steps are interrelated. Thus the interrelationship between said charging, said polymerizing, said dispersing, said liquid phase removal, and said substantially constant temperature and corresponding substantially constant pressure in said reaction zone is such that:

a. the weight percentage of said matrix copolymer and said dispersed rubbers in said liquid phase in said reaction zone is maintained at a substantially constant value which is sufficient to make the viscosity of said liquid phase be below about 1,000,000 centipoises measured at said constant temperature in said reaction zone and at 10 reciprocal seconds shear rate (herein simply "sec.$^{-1}$"), and b. the rate at which said matrix copolymer is formed from said monomer composition in said reaction zone ranges from about 0.05 to 2.0 (preferably 0.1 to 1.0) pounds of said matrix copolymer produced per pound of said liquid phase per hour, though larger or smaller rates are sometimes advantageous. The interrelationship in said reaction zone between said mixing action and said vapor phase removal is such that said reaction system is maintained under substantially isothermal conditions.

Further, the interrelationship between said charging, said vapor phase removal, and said reaction zone being such that:

1. at least about 10 percent of the heat of reaction is removed from said reaction zone by said vapor phase removal,
2. up to about 90 percent of the heat of reaction is absorbed by said charging, and
3. up to about 50 percent of the heat of reaction is removed through the peripheral boundaries of said reaction zone through heat transfer.

The limits on the respective quantities of heat of reaction removed by one of these three techniques are variable over wide ranges, depending upon individual circumstances, especially type and size of equipment as those skilled in the art will appreciate. Usually and typically, not more than about 200 percent of the heat of reaction is removed through vapor phase removal (for example, by reflux consensation), not less than about 5 percent is removed through charging absorption, and not more than about 25 percent is removed through charging absorption, and not more than about 25 percent is removed through heat transfer through reaction zone peripheral boundaries. In one preferred mode of operating at steady state conditions, the heat of reaction removed through vapor phase removal ranges from about 25 to 45 percent, the heat of reaction removed through absorption by charging ranges from about 55 to 75 percent, and the heat of reaction removed through reaction zone peripheral boundaries (e.g. a reactor wall) ranges from about $-10$ to $+10$ percent. Percentages over 100 percent indicate heat being removed at a greater rate than being generated; percentages under 0 (negative values) indicate heat input, as by heat transfer.

By the practice of the process, heat of reaction removal is so efficient through vapor phase removal that it is sometimes convenient and desirable to operate by having peripheral boundaries of the reaction zone at a somewhat higher temperature than the interior thereof, since such a heat input drives vapor phase removal in the direction of superior temperature control of the reaction zone interior. In one more preferred mode of operating, about one third of the heat of reaction is removed through vapor phase removal and the remaining two third approximately is removed through charging absorption with substantially none being removed through the peripheral boundaries of the reaction zone.

In preferred modes of practicing this invention, the vapor phase removed as above indicated is condensed and returned to the reaction zone (as by a reflux condensation) so as to constitute thereby a portion of the monomer composition charged to this zone. Preferably, the charging is accomplished by spraying, as in an atomized form, the monomer composition into the reaction zone.

Preferably, the process is practiced so that, as under virtual steady state conditions, the weight percentage of matrix copolymer formed in the liquid phase in the reaction zone is at least about 35. More preferably, this weight percentage of matrix copolymer formed ranges from about 50 to 80 with conversion rates of at least about 0.5 lbs. of matrix copolymer/lb. liquid phase/hr. Preferably, the process is so practiced that the viscosity of such liquid phase ranges from about 50,000 to 150,000 centipoises at the constant temperature of the reaction zone and at 10 sec.$^{-1}$.

The Monomer Composition

The monomer formulation comprises, at least principally, a monoalkenylaromatic monomer and a ethylenically unsaturated nitrile monomer. The monoalkenylaromatic monomer comprises at least one monomer of the formula:

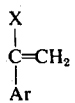

where Ar is selected from the group consisting of phenyl, halophenyl, alkylphenyl and alkylhalophenyl and mixtures thereof and X is selected from the group consisting of hydrogen and an alkyl radical of less than three carbon atoms.

Exemplary of the monomers that can be employed in the present process are styrene; alpha-alkyl monovinylidene monoaromatic compounds, e.g. alpha-methylstyrene, alpha-ethylstyrene, alpha-methylvinyltoluene, etc.; ring-substituted alkyl styrenes, e.g. vinyl toluene, o-ethylstyrene, p-ethylstyrene, 2,4-dimethylstyrene, etc.; ring-substituted halostyrenes, e.g. o-chlorostyrene, p-chlorostyrene, o-bromostyrene, 2,4-dichlorostyrene, etc.; ring-alkyl, ring-halo-substituted styrenes, e.g. 2-chloro-4-methylstyrene, 2,6-dichloro-4-methylstyrene, etc. If so desired, mixtures of such monovinylidene aromatic monomers may be employed.

Exemplary of the unsaturated nitriles which may be used in the interpolymers are acrylonitrile, methacrylonitrile, ethacrylonitrile, and mixtures thereof.

Exemplary of the monomers which may be interpolymerized with the monoalkenylaromatic monomers and unsaturated nitriles are conjugated 1,3 dienes, e.g., butadiene, isoprene, etc.; alpha- or beta-unsaturated mono-basic acids and derivatives thereof, e.g. acrylic acid, methyl acrylate, ethyl acrylate, butyl acrylate, 2-ethylhexyl acrylate, methacrylic acid and the corresponding esters thereof, acrylamide, methacrylamide; vinyl halides such as vinyl chloride, vinyl bromide, etc.; vinylidene chloride, vinylidene bromide, etc.; vinyl esters such as vinyl acetate, vinyl propionate, etc.; dialkyl maleates of fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer or a partially polymerized material such as a partially polymerized monoalkenylaromatic hydrocarbon or interpolymer thereof.

The polymerizable monomer mixtures contain at least 20 percent by weight of the monoalkenylaromatic monomer and preferable at least 50 percent by weight thereof. They also contain at least 5 percent by weight of the unsaturated nitrile and preferably at least 10 percent by weight thereof. From the standpoint of highly advantageous commercial practice, the monomer formulations contain 20 to 95 percent, and preferably 60 to 85 percent, by weight of the vinylidene aromatic hydrocarbon and 80 to 5 percent, and preferably 40 to 15 percent, by weight of the unsaturated nitrile.

A convenient and even preferred mode of operation is to continuously charge, as with monomer composition, a chain transfer agent to the reaction zone. Such agents and their use are well known to those skilled in the art and include mercaptans, dimercaptides, organic thio acids, terpene derivatives and terpinic materials, hydrocarbon liquids, halogenated hydrocarbons, and the like, of which a preferred such agent is terpinolene. A suitable continuous charging rate falls in the range of from about 0.01 to 2 weight percent based on total monomer composition charged.

A conventional solvent liquid can be continuously charged into the reaction zone. Such is convenient when slight chain transfer action is desired, as may be observed, for example, with ethyl benzene in making copolymers having a low (less than 50 weight percent) alkenyl nitrile compound content. A polar solvent, such as methyl ethyl ketone, is conveniently used making copolymers having a low monoalkenyl aromatic compound content. Any suitable solvent liquid known to the art may be used but is not preferred, since such must usually be removed after polymerization. A convenient charging rate falls in the range of from about 0.01 to 15 weight percent based on total monomer composition charged chosen so as to keep the quantity of solvent liquid in the reaction zone at a substantially constant value or level.

A part of the monomer composition charged to the reaction zone can be a copolymerizable monomer, such as an acrylate, a methacrylate, a maleate, a fumarate, a vinyl ether, and the like. A monomer composition can contain up to about 25 weight percent based on total monomer composition charged of such an added monomer to form by definition of the present invention the matrix copolymer of copolymerizable monomers. Optionally, sometimes one may desire to have present in a reaction zone other non-monomeric non-participating (as respects the process of the present invention) additives, such as lubricants, stabilizers, antioxidants, colorants, dyes, plasticizers, fungicides, insecticides, brighteners, fillers, modifiers, extenders, and the like. While up to 15 or 20 or even more percent of a polyblend product can contain such additive(s), it is preferred to have the liquid phase withdrawn from the reaction zone contain less than about 5 weight percent (total weight basis) thereof comprise such, in the interest maximizing process efficiency.

Optionally a part of the monomer composition can be a polymerization initiator. A suitable continuous charging rate ranges from about 0.005 to 1 weight percent based on total monomer composition charged. Such agents and their use are well known to those skilled in the art and include organic peroxides, hydroperoxides, organic azo nitriles, persulfates, percarbonates, perborates, silane peroxides, and the like, of which a preferred initiator is ditertiary butyl peroxide.

Styrene/acrylonitrile matrix copolymer polyblends are one type of preferred polyblends for manufacture by the present process, especially those matrix copolymers which comprise from about 5 to 85 weight percent acrylonitrile and from about 15 to 95 weight percent styrene. Styrene/methacrylonitrile matrix copolymer polyblends are another type of polyblends suitable for manufacture by the present process, especially those matrix copolymers comprising from about 60 to 95 weight percent methacrylonitrile and from about 5 to 40 weight percent styrene. Still another type of matrix copolymer polyblends suitable for manufacture by the present process contains styrene, acrylonitrile and methacrylonitrile, for example, from about 5 to 40 weight percent styrene, from about 40 to 70 weight percent acrylonitrile, and from about 5 to 30 weight percent methacrylonitrile. Those skilled in the art will appreciate readily that more than one alkenyl nitrile compound and more than one monoalkenyl aromatic compound may be used in a starting monomer composition when practicing the present invention. Preferably, polyblends produced by the present invention are separated from unreacted monomer composition on an industrial scale using at least one stage of wiped film devolatilization as disclosed in U.S. Pat. No. 3,797,550.

Preferably, the present invention is practiced using a mixer reactor of the type shown in FIG. 1 which, among other things, produces a type of mixing action which is more fully hereinafter described. It is preferred to use mixing conditions in a reaction zone which generate and maintain substantially laminar flow in the liquid phase.

Monomer compositions utilized in a reaction zone boil in the range of from about 75° to 200°C. at 760 mm Hg., and preferably in the range of from about 75° to 170°C. Individual monomers may be charged to a reaction zone individually or in admixture with other materials charged to a reaction zone.

DRAWINGS

The present invention is better illustrated by reference to the attached drawings wherein.

Figure 4:
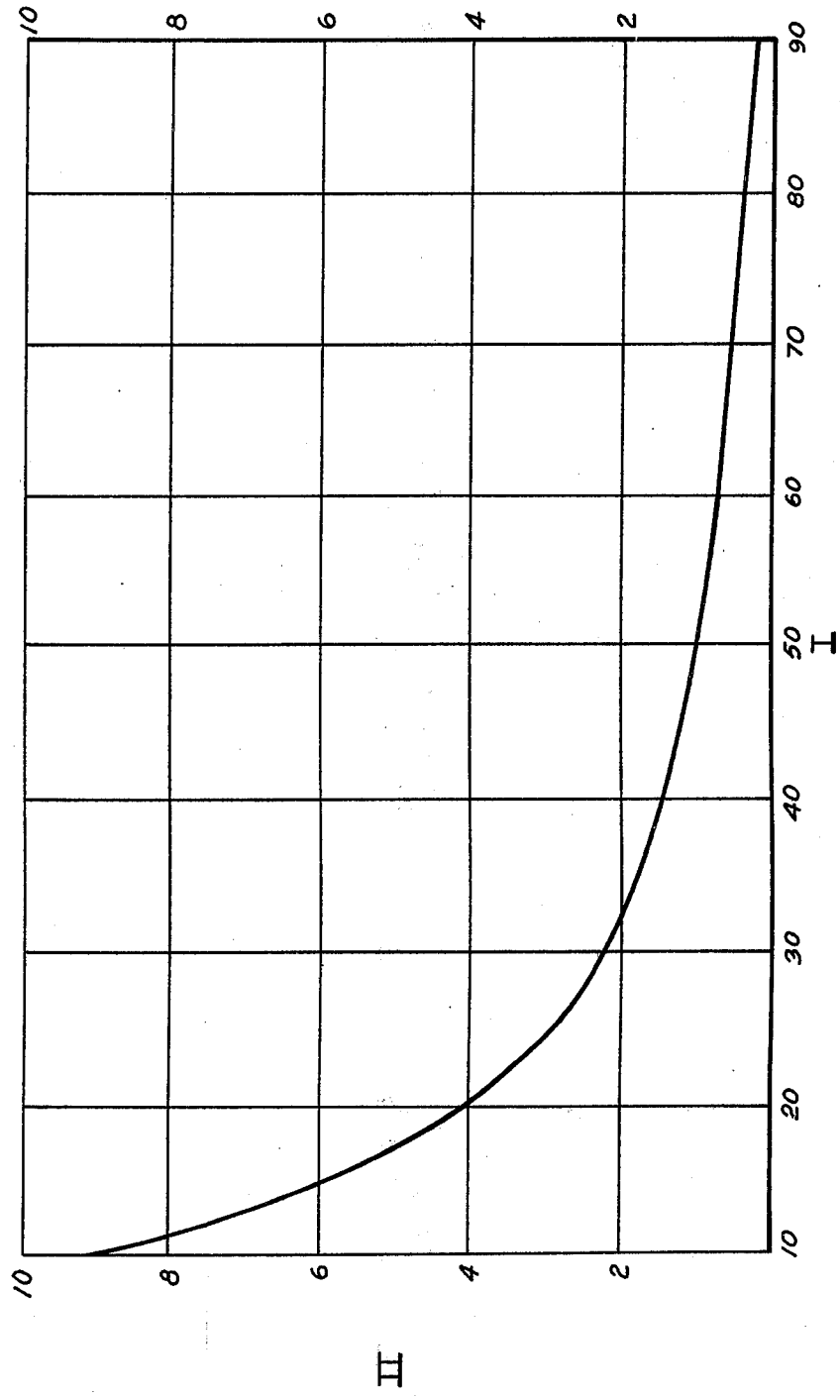

FIG. 3 is a plot showing the relationship between alkenyl nitrile monomer and polymer composition for a typical matrix copolymer (styrene/acrylonitrile) made in accordance with the process of the present invention; and FIG. 4 is a plot showing the relationship between conversion in a continuous mass polymerization of comonomers such as styrene and acrylonitrile, and the monomer/polymer separation load for a typical polymer (styrene/acrylonitrile) matrix copolymer product produced by such continuous mass polymerization.

Figure 1:
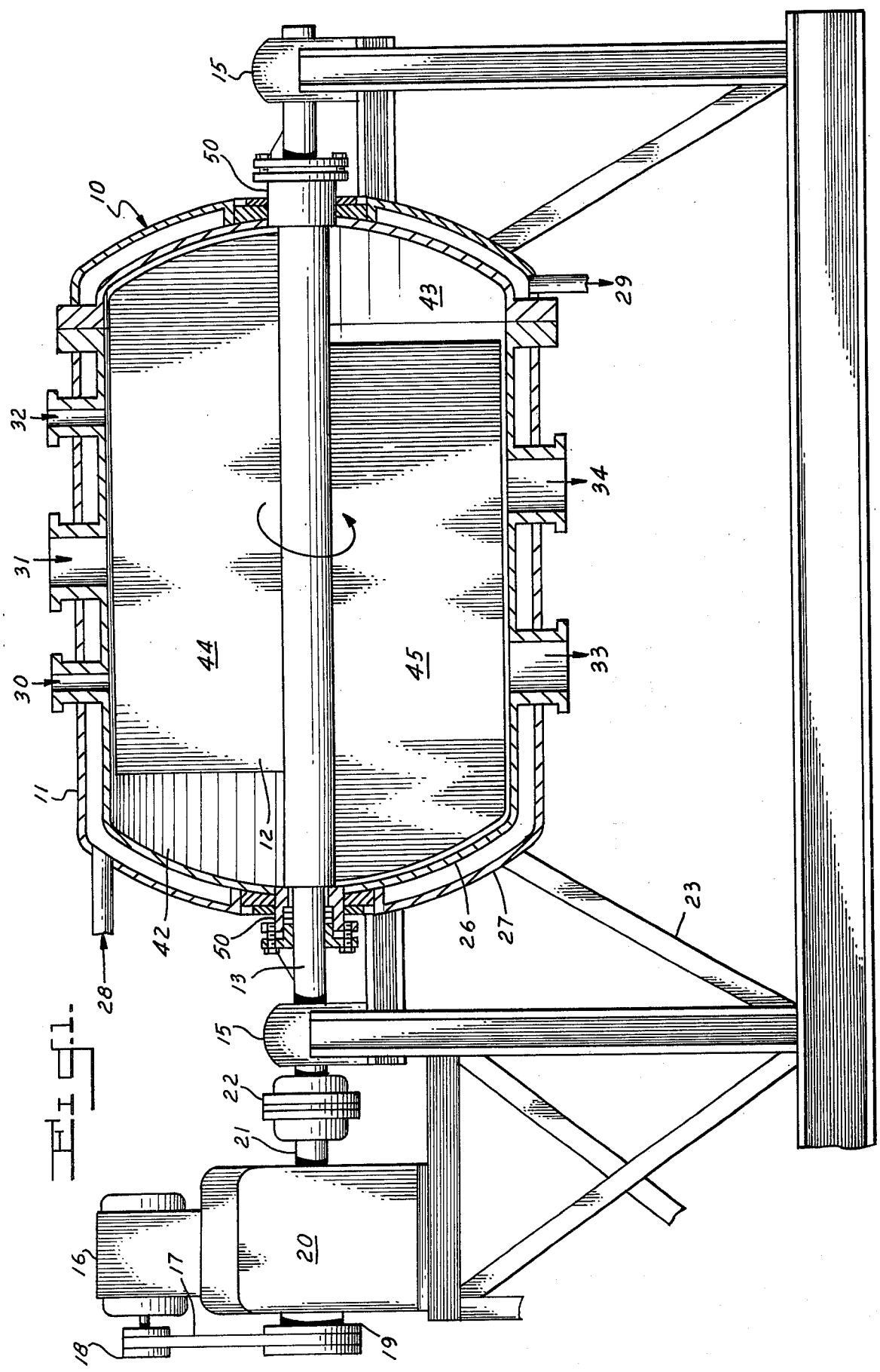
FIG. 1 is a diagrammatic side elevational view of a horizontal continuously stirred mixer/reactor of the type suitable for use in the practice of the present invention.

Referring to FIG. 1, there is seen an embodiment of mixer/reactor assembly of the type disclosed in U.S. Pat. No. 3,751,010 of George A. Latinen, here designated in its entirety by the number 10, generally formed of steel or the like, which may be employed in the practice of the present invention. Mixer/reactor 10 is seen to comprise a vessel assembly 11 having an impeller assembly 12. Impeller 12 extends through vessel 11 on a shaft 13. Where it passes through vessel 11, shaft 13 is sealed by seals 50 (paired). Shaft 13 is journaled for rotational movements by a pair of bearing assemblies 15.

A motor 16 is connected by a belt 17 over sheaves 18 and 19 to a transmission or reducer 20. Transmission 20 has a drive shaft 21 which interconnects with shaft 13 through a coupling 22. The mixer/reactor assembly 10 is supported by a frame 23.

Vessel 11 has an inner wall 26 and spaced therefrom, an outer wall 27, with the space therebetween serving for circulation therethrough of a heating or cooling fluid, as through input conduits 28 and output conduits 29 (only one each shown). Material for reacting may be fed into vessel 11 through conduits 30, 31 and/or 32 continuously, and material in vessel 11 may be removed therefrom through conduits 33 and/or 34 in conventional ways as those skilled in the art will appreciate. For example, if mixer/reactor 10 is to be used as a reactor for continuous mass polymerization of a monomer mixture such as styrene and acrylonitrile, conduit 31 may be connected to a reflux condenser assembly (not shown); the monomer mixture is continuously sprayed into vessel 11 through a conduit 30 and mass polymerized in a partially fluid filled vessel 11. The first and second grafted rubbers are continuously fed through conduit 31 or 32 as a dispersion of said rubbers in said monomers. The grafted rubbers become dispersed in the polymerizing liquid phase forming an ABS polyblend with the matrix copolymer being polymerized and solubilized in the liquid phase. The liquid phase is continuously removed from vessel 11 through conduit 34, agitation being accomplished by the revolution of impeller 12.

The impeller assembly 12 includes a shaft extending substantially along said longitudinal axis. The impeller or paddle assembly 12 has at least one pair of opposed blade members 44 and 45. Each member 44 and 45 is affixed to said shaft 13 and is generally equally circumferentially spaced one member from another. Each blade member 44 and 45 in the embodiment shown generally radially extends from said shaft to near engagement with interior wall surfaces of vessel 11 and axially extends at least about one half the length of the chamber in vessel 11 from one end thereof and has at least one discontinuity, therein 42 and 43, respectively in the remaining half thereof. The paddle assembly 12 is adapted to impart to a fluid of relatively high viscosity filling said chamber to an extent of from about 10 to 90 percent by volume during rotational movements of said shaft at angular velocities below the level of turbulent flow in said fluid simultaneously a combination of three types of mixing:

a. cyclical vertical displacement of said fluid in said chamber at a cycle rate ranging from about one half to 60 times per minute, b. rolling action in said fluid in a peripherally located, generally horizontally extending region in said chamber which moves normally to the horizontal with a shear rate of at least about 5 sec.$^{-1}$ between said blade members and said chamber, and c. horizontal displacement in said chamber in said fluid at an equivalent cycle rate of from about one tenth to 30 times the total volume of said fluid in said chamber.

One type involves cyclical vertical displacement in said zone such that, at a cycle rate in the range from about one half to 60 times per minute, a. first, said liquid phase is subjected to a vertical lifting force greater than that exerted downwardly thereon by gravity, and at least sufficient to move vertically at least about 10 percent of the total volume of said fluid from a gravitationally lower region to a gravitationally higher region in said zone, and b. secondly, such so displaced liquid phase is subjected to a gravitational falling force by effective removal of said lifting force therefrom, the total gravitational falling force applied thereon being at least sufficient to return substantially all of such so displaced liquid phase to said gravitationally lower region before said cycle is repeated on such so displaced liquid.

A second type involves rolling action in a generally peripherally located and generally horizontally extending region in said zone, such region extending circumferentially about the entire internal periphery of said zone, and such region being continuously moving in a direction which is generally normal to the horizontal. This rolling action is produced by a similarly so moving band of pressure located adjacent to, but following behind such region, said band of pressure exerting a force on said liquid phase in said region at least sufficient to cause movement of a portion of said liquid phase in said region along a roughly cross-sectionally circular path normally away from the adjacent internal periphery of said zone adjacent said band of pressure towards the interior of said zone a distance which is generally less than the maximum distance across said zone at a given peripheral position and then back towards said integral periphery forwardly of said band of pressure before moving towards said band of pressure. A shear rate between said internal periphery and said zone of pressure is maintained at least about 5 sec.$^{-1}$.

The third type involves horizontal displacement in said zone in a longitudinal circulartory manner at a cycle rate such that the actual volume of said liquid phase moved from one end region of said treating zone to the opposite end region thereof and back within one minute is equivalent to from about one tenth to 30 times the total volume of said liquid phase in said zone. Such equivalent volume and the horizontal circulation rate for such liquid phase so moved are, respectively, approximately proportional to said cyclical vertical displacement cycle rate in any given instance. Substantially, the total volume of said liquid phase in said zone is continuously maintained under laminar flow conditions during all three types of mixing.

Preferably, mixer/reactor 10 utilizes a vessel 11 having defined therein a chamber which is cylindrical. Preferably, this chamber has dimensions such that the ratio of the axial length of said chamber along longitudinal axis to the maximum chamber diameter ranges from about 0.5 to 3.5. Preferably, the apparatus has paddle blades which are either radially curved or are flattened. Alternatively, the apparatus has paddle blades which are helically curved about the shaft.

A mixer/reactor 10 is adapted to achieve and maintain substantial homogeneity and uniformity in a liquid agitated by paddle assembly 12 and is preferred for use in the practice of the present invention, though those skilled in the art will appreciate that any convenient means may be employed which will provide process conditions as taught and utilized herein for the practice of the present invention.

In the preferred practice of the present invention, a mixer/reactor 10 is equipped with a reflux condenser means and control means. The reflux condenser means is conventional, and thus may comprise a shell and tube assembly, which assembly is interconnected with conduit 31 in housing 11. Means for cooling heat exchange surface portions of such condenser assembly cause, during operation, vapors removed through conduit 31 to be condensed. Virtually, any conventional reflux condenser may be used here, as those skilled in the art will appreciate. The control means is seen to regulate the quantity of vapor withdrawn from a mixer/reactor 10 into the condenser. The control means typically includes: (1) condition sensing means for sensing temperature and/or pressure in said housing and for generating a signal output representative thereof, (2) variable valve means adapted to regulate the flow of vapor from said chamber into said condenser, and (3) control means responsive to said signal output adapted to operate said variable valve means. Conventional control elements well known to those skilled in the art may be used.

Figure 2:
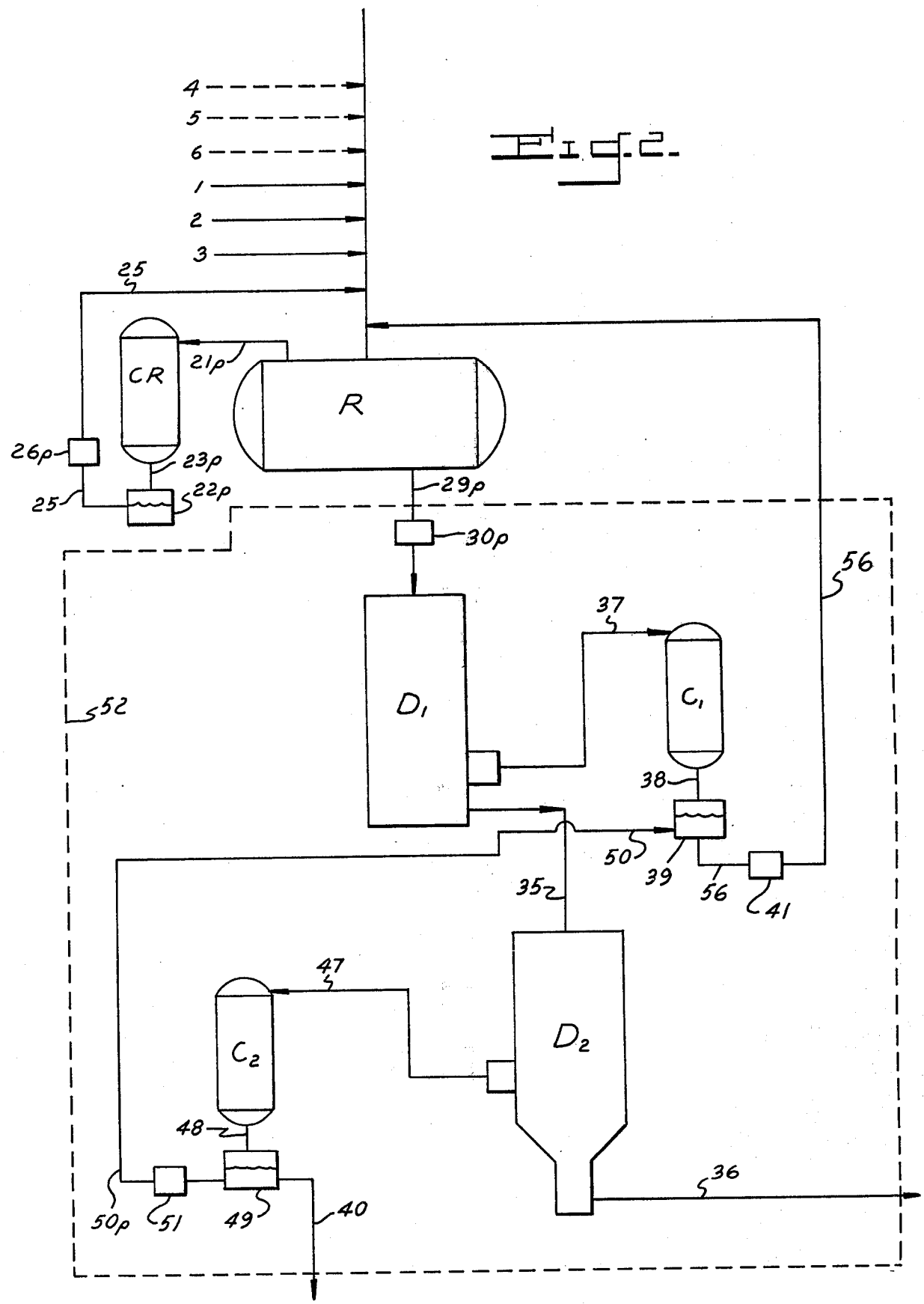
FIG. 2 is a flow diagram of an apparatus assembly incorporating a mixer/reactor of FIG. 1 and suitable for the practice of the process of the present invention.
Figure 7:
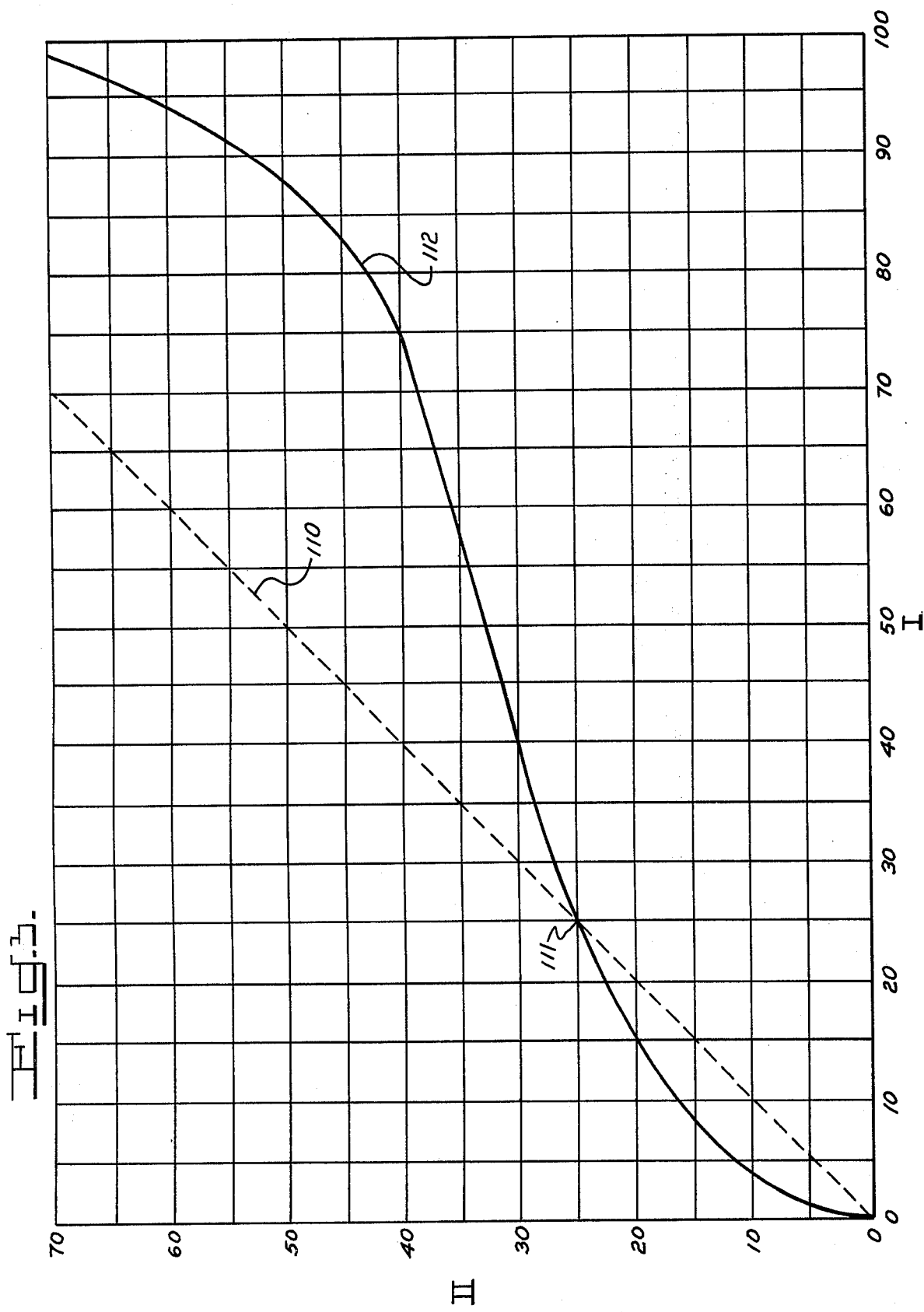

Turning to FIG. 2, there is seen a simplified flow diagram illustrating one form of polymerization equipment suitable for use in the practice of the polymerization process of the present invention, and in addition illustrating one method of subsequently processing a polymer/monomer mixture having a first and second rubber dispersed therein wherein an ABS polyblend is produced in accordance with such polymerization process and wherein unreacted monomer is separated from the polyblend product. In FIG. 2, a mixer/reactor of the type shown in FIG. 1 is designated R. Charged to mixer/reactor R on a continuous and controlled basis are: (1) at least one monoalkenyl aromatic compound as through a line 1; (2) at least one lower alkenyl nitrile compound as through a line 2; (3) a dispersion of said first and second grafted rubbers in said monomers as through line 3; and (4) optionally, a chain transfer agent as through a line 4. Optionally, some other monomer may be charged to mixer/reactor R as through a line 5, and/or a diluent, initiator, etc., may be charged to mixer/reactor R as through a line 6.

Mixer/reactor R is connected to a reflux condenser CR by means of a pipe 21p. Condensate from condenser CR passes into a receiver 22p through a pipe 23p. The level of condensate in receiver 22p is conventionally controlled or controllable by a conventional level controller (not shown) so that the fluid level in receiver 22p is maintained at a predetermined level by recycling condensate from receiver 22p to mixer/reactor R through line (pipe) 25. In line 25 is functionally mounted a pump 26p whose operation is controlled by the level controller.

The amount of vapor removed from mixer/reactor R is controlled or controllable by a conventional pressure controller (not shown). Thus, for example, this pressure controller can receive an electric signal output from a pressure transducer (not shown) whose sensing element is functionally connected with the vapor space of receiver 22p. This pressure controller operates to control the rate of vapor removal through a valve or valves (not shown) from mixer/reactor R through line 21p. Alternatively, the amount of vapor removed from mixer/reactor R is controlled or controllable by a conventional temperature controller (not shown). Thus, for example, a thermocouple (not shown) located functionally in the mixer/reactor R can feed its signal output to the temperature controller to control the rate of vapor removal through a valve or valves (not shown) from mixer/reactor R through line 21p.

A mixture of matrix copolymer, first and second grafted rubbers and monomer is continuously and controllably withdrawn from the mixer/reactor R through line 29p, as by a pump 30p. The flow rate in line 29p is typically either held constant or controlled in a fashion to maintain the stream in line 56 at a substantially constant flow rate.

The mixture of matrix copolymer, first and second grafted rubbers and monomer from the mixer/reactor R is then typically processed to separate out the ABS polyblend. For example, in FIG. 2, this mixture from mixer/reactor R is fed to a devolatilizer D1. Melt from devolatilizer D1 (with typically at least 90 weight percent of the monomer removed therefrom) leaves devolatilizer D1 through pipe 35 and is delivered to a second devolatilizer D2. Melt from devolatilizer D2 (which consists of substantially pure matrix copolymer and dispersed first and secone grafted rubbers typically containing less than about 0.5 weight percent monomer) is fed through a pipe 36 to a conventional pelletizer apparatus (not shown). Monomer vapor removed from the ABS polyblend in devolatilizer D1 is conducted through line 37 to a condenser C1 and, hence, through a pipe 38 to a receiver 39. From receiver 39, the condensate is conducted through a line 56 by pump 41 back to the reactor R. Similarly, monomer vapor removed from the ABS polyblend in devolatilizer D2 is conducted through line 47 to a condenser C2 and, hence, through a pipe 48 to a receiver 49. From receiver 49, the condensate is either conducted through a line 50p by a pump 51 back to the receiver 39 (and, hence, to the reactor R) or conducted out of the process through a line 40. Condenser C2 may be refrigeratively cooled. Preferred devolatilizers are of the wiped film type. Sometimes a single devolatilizer is sufficient. Conventional equipment may be used here.

The dotted line 52 circumscribes the ABS polyblend/monomer recovery system described in FIG. 2. Those skilled in the art will appreciate that any conventional separation means may be used to effectuate such a separation of product polymer produced by the process of the present invention from unreacted monomer. Instead of separating monomer from the ABS polyblend after the reaction product leaves mixer/reactor R, one may convert all or part of the remaining monomer to matrix copolymer, as in a second or subsequent reaction zone (not shown in FIG. 2), for example.

For test or analysis purposes, one can use an appropriately sized test bomb. Typically, such a bomb is conveniently evacuated, interconnected with a process line (here, for example, liquid line 29p), filled with process liquid phase to a desired extent, sealed, removed, quenched, and the bomb contents analyzed. Subsequent processing of product from mixer/reactor R forms no integral feature of the present invention, as those skilled in the art will appreciate.

FIG. 3 serves to illustrate a major advantage of the present invention. In this Figure, coordinate I designates weight percent acrylonitrile in monomers polymerizing, while coordinate II designates weight percent acrylonitrile in instantaneously forming matrix copolymer. The 45° dotted line 110 represents (for illustrative and comparative puposes) a hypothetical matrix copolymer of a comonomer system wherein the composition of the instantaneously forming matrix copolymer is always the same as that of the reacting monomers, while the solid line curve 112 designates the actual composition of a styrene/acrylonitrile copolymer formed in the presence of various indicated relative percentages of acrylonitrile for a given monomer composition. Except for the point 111, which is known to those skilled in the art as the monomer/copolymer azeotrope, curve 112, the instantaneous monomer and copolymer compositions are not the same, which is typical for alkenyl nitrile/monoalkenyl aromatic monomer copolymers. While the character of curve 112 generally illustrates a wide variety of polymerization conditions, point 111 describes a matrix copolymer composed of approximately 25 weight percent acrylonitrile and 75 weight percent styrene. The exact azeotrope composition at point 111 is somewhat dependent upon exact reaction conditions employed during mass polymerization, a situation which those skilled in the art will appreciate true for many copolymers. Here, when the concentration of acrylonitrile in the monomer composition is below that existing at point 111, the respective compositions of the reacting monomer mixture and of the resultant instantaneously formed copolymer product both tend to go down in acrylonitrile content as conversion increases in a closed system but at different relative rates. On the other hand, when the amount of acrylonitrile present in a monomer composition is greater than that existing at point 111, the weight percentage of acrylonitrile in monomer composition as well as that incorporated into the resulting instantaneously formed matrix copolymer product both tend to rise as polymerization proceeds but at different respective relative rates. As a consequence, except at point 111, when one desires to select and maintain a particular styrene/acrylonitrile monomer composition in which the amount of acrylonitrile present is greater or less than the amount of acrylonitrile desired to be present in the product copolymer, the amount in any given instance being as taught, for example, by FIG. 3, one must continuously feed into, and mix into, the polymerizing mass fresh monomers at controlled ratios (of one monomer to the other) and rates. In other words, the composition of the monomer composition of the polymerizing mass must be carefully regulated in order to produce a matrix copolymer product having a narrow composition distribution. Maintenance of constant composition aids in controlling molecular weight distribution (which is primarily dependent upon temperature and chain transfer agent concentration, and, to a lesser extent, upon conversion). The process of the present invention thus enables one to prepare non-azeotrope matrix copolymers of alkenyl nitrile monomers and monoalkenyl aromatic monomers having narrow and substantially constant molecular weight distribution and narrow and substantially constant composition distributions at high conversion and rates of conversion.

It is a characteristic of styrene/acrylonitrile type matrix copolymers that, if the acrylonitrile content of one styrene/acrylonitrile type copolymer product varies by more than a few percentage points (say, for example, about 5 percent) in acrylonitrile content from a second styrene/acrylonitrile type copolymer, and the first such copolymer is admixed with the second such copolymer, there is produced a product composition which has poorer physical strength characteristics, than does a single copolymer similarly extruded which has substantially uniform composition and an acrylonitrile content midway between that of said first and said second such copolymers forming such mixture. It is possible that if one so mixes together such a first with such a second styrene/acrylonitrile coplymer, there characteristically results an increase in the yellowness of the resulting composition as compared with the yellowness of such a single copolymer similarly mixed (particularly such a single copolymer made at relatively low polymerization temperature). Such characteristics serve to illustrate the importance of producing uniform matrix copolymer products of the type characteristically produced by the practice of the present invention.

In general, as those skilled in the art appreciate, the higher the acrylonitrile content of a particular styrene/acrylonitrile matrix copolymer, the greater the yellowness associated therewith. In fact, as those skilled in the art appreciate, because of this yellowness effect, it is typical and customary in the art at the present time to produce styrene/acrylonitrile type matrix copolymers having an acrylonitrile content generally less than about 50 percent to avoid yellowness, particularly for use in those applications where color is considered critical, and to avoid the loss of certain other physical and optical quantities, so that, even though such high acrylonitrile containing matrix copolymers may be produced by the practice of the present invention, market demand for such in the past has usually been relatively low. Furthermore, depending somewhat upon the particular reaction conditions chosen, when one chooses to practice the present invention using monomer compositions containing high (for example, over about 65 weight percent typically) acrylonitrile, there is a tendency for the matrix copolymer to precipitate out of the solution of liquid monomers in the reaction zone. This is considered presently to be an undesirable situation since such can result in deposition of matrix copolymer product on the interior walls and surfaces of the reaction zone (the reactor and the agitator therein). Hence, in the absence of a diluent, it is now generally preferred to practice this invention so as to produce a copolymer which contains less than about 50 weight percent acrylonitrile.

When, however, one desires to produce by the practice of the present invention a matrix copolymer product containing methacrylonitrile, it will be appreciated even in the absence of a diluent that the relative weight percentage of methacrylonitrile in the matrix copolymer can be appreciably greater than about 50 weight percent without objectionable yellowness, haze, or loss of physical properties (compared to, for example, such a copolymer containing less than about 50 weight percent methacrylonitrile). Depending on the choice of process conditions selected for a particular situation (from among those conditions generally specifically taught herein) the loss of solubility of matrix copolymer product in liquid monomer composition in the reaction zone for increasing alkenyl nitrile copolymer contents can be minimized to the point where such does not adversely affect practice of the present process, particularly for relatively short continuous runs. Sometimes a combination of methacrylonitrile and acrylonitrile can be used advantageously in the monomer composition in practicing the present invention to produce the matrix copolymers with monoalkenyl aromatic compounds. The principles of the present invention are advantageous to practice when it is desired to produce such a matrix copolymer product having a substantially uniform content and distribution of alkenyl nitrile in order to obtain a maximum of clarity and a minimum of yellow color, and to produce such a matrix copolymer product at a high level of conversion and conversion rate.

Continuous mass polymerization processes for making matrix copolymers of monoalkenyl aromatic monomers and lower alkenyl nitrile monomers having rubbers dispersed therein have generally heretofore been operated at conversion levels of less than about 25 to 35 percent (more or less) because of the difficulties of (a) uniformly removing heat from the reaction mass, (b) achieving substantially uniform mixing of monomers with matrix copolymer and dispersed rubber continuously and independently of how the monomer and rubber are introduced into the system or the ABS polyblend is removed therefrom, and (c) controlling the temperature (and, hence, pressure) of the reaction system in the polymerization zone at precise (substantially isothermal) values. However, at low levels of conversion (e.g., below 35 percent), it is necessary to remove from the mixture of the ABS polyblend product and unreacted monomers significant amounts of monomer in order to separate out a relatively pure product of monomer in order to separate out a relatively pure product thermoplast, which, in turn, necessitates not only consumption of large amounts of energy but also the utilization of large (and costly) pieces of equipment to achieve the desired end of monomer removal from the ABS polyblend product.

The undesirability of low conversion levels is illustrated by FIG. 4. In this Figure, coordinate I designates the weight percent of styrene/acrylonitrile matrix copolymer in a total reactor effluent fluid, while coordinate II designates the weight (herein pounds) of monomer which must be removed (or reacted) per pound of product copolymer produced, based on total reactor effluent fluid. For example, at a conversion level of about 10 percent, one must remove about nine pounds of monomer per pound of copolymer produced, whereas at a level of conversion of about 50 percent, one must remove only about 1 pound of monomer for each pound of polymer produced. At higher conversion levels, the amount of monomers removed per pound of matrix copolymer produced is seen to be even less. Higher conversion levels greatly reduces the overall costs of removing monomer from polymer product. Such desirably higher conversion levels are readily and conveniently achieved by the practice of the present invention.

As those skilled in the art of chemical engineering will appreciate, reflux condensation can be used to control heat evolved from many exothermic reactions. However, in the case of a continuous mass polymerization in a reaction zone wherein the polymerizing mass of high viscosity fluid comprising monoalkenyl aromatic monomer, lower alkenyl nitrile monomer and a matrix copolymer formed therefrom, the mass heretofore has generally not been uniformly completely, and continuously mixed. Consequently, reflux condensation cannot be used to achieve uniform and constant temperature regulation and control throughout such polymerizing mass, particularly at higher rates of conversion and higher conversion levels where viscosities are greatest. When such reacting mass is less than so completely mixed, reflux concentration does not then produce uniform heat removal or temperature control in such mass because of the existing inherent monomer compositional variations throughout such mass. Uniform, complete, continuous mixing of such mass has been found to eliminate such compositional variations. When reflux condensation is used to control temperature of such a so-mixed mass, surprisingly and unexpectedly very exact and precise regulation and control of the temperature (and pressure) of such mass becomes possible. So far as is now known, no one has heretofore used such a combination of uniform, complete, and continuous mixing with reflux condensation (or, broadly, vapor removal) to achieve continuous mass polymerization of monoalkenyl aromatic monomers and lower alkenyl monomers have first and second grafted rubbers dispersed therein to form ABS polyblends.

The Diene Rubber

The preferred rubbers are diene rubbers, including mixtures of diene rubbers, i.e., any rubbery polymer (a rubbery polymer having a second order transition temperature not higher than 0° centigrade, preferably not higher than −20° centigrade, as determined by ASTM Test D-746-52T) of one or more of the conjugated, 1,3-dienes, e.g., butadiene, isoprene, 2-chloro-1,3 butadiene, 1 chloro-1,3butadiene, piperylene, etc. Such rubbers include copolymers and block copolymers of conjugated 1,3-dienes with up to an equal amount by weight of one or more copolymerizable monoethylenically unsaturated monomers, such as monovinylidene aromatic hydrodcarbons (e.g., styrene; an aralkylstyrene, such as the o-, m- and p-methylstyrenes, 2,4-dimethylstyrene, the arethylstyrenes, p-tert-butylstyrene, etc.; an alphamethylstyrene, alphaethylstyrene, alpha-methyl-p-methyl styrene, etc.; vinyl naphthalene, etc.); arhalo monovinylidene aromatic hydrocarbons (e.g., the o-, m- and p-chlorostyrene, 2,4-dibromostyrene, 2-methyl - 4 - chlorostyrene, etc.); acrylonitrile; methacrylonitrile; alkyl acrylates (e.g. methyl acrylate, butyl acrylate, 2-ethylhexyl acrylate, etc.), the corresponding alkyl methacrylates; acrylamides (e.g. acrylamide, methacrylamide, N-butylacrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g., vinyl acetate, vinyl stearate, etc.); vinyl and vinylidene halides (e.g. the vinyl and vinylidene chlorides and vinylidene chlorides and bromides, etc.); and the like.

A preferred group of rubbers are the stereospecific polybutadiene rubbers formed by the polymerization of 1,3 butadiene. These rubbers have a cis-isomer content of about 30–98% and a trans-isomer content of about 70-2% and generally contain at least about 85% of polybutadiene formed by 1,4 addition with no more than about 15% by 1,2 addition. Mooney viscosities of the rubber (ML-4, 212°F.) can range from about 20 to 70 with a second order transition temperature of from about −50°C. to −105°C. as determined by ASTM Test D-746-52T.

The diene rubber used in preparing the first grafted diene rubber is a diene rubber of the type described above. The stereospecific polybutadiene rubbers are the most preferred to optimum physical properties of the polyblend.

The diene rubbers used in the second grafted rubber is of the type described above. A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene. The diene rubber may contain up to about 2 percent of a crosslinking agent based on the weight of the rubber monomer or monomers. The crosslinking agent can be any of the agents conventionally employed for crosslinking diene rubbers, e.g., divinylbenzene, diallyl maleate, diallyl fumarate, diallyl adipate, allyl acrylate, allyl methacrylate, diacrylates and dimethacrylates of polyhydric alcohols, e.g. ethylene glycol dimethacrylate, etc.

The First Grafted Diene Rubber

The first grafted diene rubber can be prepared in a mass-suspension process as disclosed in U.S. Pat. No. 3,509,237 to N. E. Aubrey, Col. 6, lines 11—75 and Col. 7, lines 1–10. The soluble diene rubber is grafted with monoalkenyl aromatic and alkenyl nitrile monomers using a monomer composition that has about the same monomer composition as the matrix phase, e.g., if the matrix composition has a styrene/acrylonitrile monomer ratio of 75/25 then the grafting monomer composition has about the same ratio of 75/25 to insure the compatibility of the first grafted diene rubber with the matrix phase in the ABS polyblend. The monomers form copolymers having the same composition as the matrix copolymer and are grafted as superstrate copolymers on the rubber substrate. During the mass polymerization step the grafted rubber molecules form a separate phase and are dispersed under agitation as grafted rubber particles having occluded copolymer within the particle as well as grafted on the surface interface to aid in its dispersion in the matrix copolymer phase.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

During the forming and dispersion of the rubber as grafted rubber particles some of the monomer is occluded within the particle which later polymerizes within the particle to form occluded copolymer having the same composition as the matrix and graft copolymer. The total amount of occluded and grafted copolymer present in the first grafted rubber particles can be from about 1 to 5 parts for each part of said diene rubber.

The rubber phase is dispersed by agitation and the agitation must be sufficient and of high enough shear to disperse and size the rubber particles uniformly throughout the monomerpolymer phase. The intensity of the stirring will vary with the size and geometry of the initial reactor, however, simple experimentation with a given stirred reactor will establish the sufficient amount of stirring needed to insure the homogeneous dispersion of the rubber particles throughout the monomer-polymer phase. The particle size of the rubber can be varied from a weight average particle diameter of from about 0.7 to 10 microns preferably from 0.7 to 5 microns to provide a balance between the impact strength and the gloss of the rubber reinforced polyblend. Higher stirring rates and shearing agitation can lower the size of the dispersed rubber particle, hence must be controlled to provide sufficient stirring to size the particles to the predetermined size needed and insure homogeneous dispersion.

The dispersed rubber phase increases the toughness of the ABS type polymeric polyblend as measured by its Izod impact strength by Test ASTM D-256-56. It has been found that the impact strength of polyblends increase with the weight percent rubber dispersed in the polyblend as used in the present invention. The impact strength is also determined by the size of the dispersed rubber particles, with the larger particles of the first grafted rubber providing high impact strength when used in the range of 0.7 to 10 microns measured as a weight average particle size diameter with a photosedimentometer by the published procedure of Graves, M. J. et al., "Size Analysis of Subsieve Powders Using a Centrifugal Photosedimentometer," British Engineering 9:742—744 (1964). A Model 3000 Particle Size Analyzer from Martin Sweets Co., 3131 West Market Street, Louisville, Kentucky was used.

The weight average diameter of the rubber particles also effects gloss with smaller particles giving high gloss and the larger particles giving low gloss to the fabricated polyblend article such as a molding or sheet product. One must balance impact strength and gloss requirements in selecting an optimum rubber particle size. The range of 0.7 to 10 microns can be used for the first grafted rubber large particles with the range of 0.7 to 5 microns being preferred and 0.8 to 3 microns being most preferred for optimum impact strength and gloss.

The mass/suspension polymerization process polymerizes monoalkenyl aromatic and alkenyl nitrile monomers having a diene rubber dissolved therein to form a first grafted diene rubber grafted and dispersed in copolymers of said monomer to form a composite polymer known as a graft copolymer. The graft copolymer of mass/suspension polymerization is recovered from the final suspension as a bead. The graft copolymer ordinarily comprises from about 0.1 to 15% by weight of diene rubber substrate dispersed in the form of discrete grafted diene particles defined as the first grafted diene rubber particles of the present invention. The beads are readily dissolved in said monomer composition with the first grafted diene rubber being dispersed as rubber particles in the monomer composition. The graft copolymer of the first grafted diene rubber can be dispersed in said monomer composition in amounts ranging from about 1 to 50% by weight of the solution formed with said monomers. The proportions of monoalkenyl aromatic monomer to alkenyl nitrile can be varied from 90/10 to 10/90 respectively. Preferably, the monomer composition comprises at least about 50% of the alkenyl nitrile monomer and preferably at least about 75% of the monomer composition is comprised of monoalkenyl aromatic and alkenyl nitrile monomers. The first grafted diene rubber is dispersed in step (E) as contained in a dispersion comprising said monomer composition having dispersed therein from about 0.1 to 15% by weight said first grafted diene rubber. The dispersion is proportionally fed by pumping or gravimetrically so as to provide the ABS polyblend with a predetermined weight percent of the first grafted rubber. The soluble copolymers of the graft copolymer enters the polyblend as a matrix copolymer having about the same monomer composition as the matrix copolymer being formed in step (D).

In addition to the first grafted rubber large particles a second grafted rubber comprising small grafted rubber particles is used in the polyblend to provide a higher level of rubber for toughness. Being smaller in size they do not lower gloss when used in larger weight percentages in the polyblend. The second grafted rubber small particles in the polyblend can range from 0.01 to 0.50 microns in diameter on a weight average basis as determined by the photosedimentometer test described for the large rubber particles. Preferably, the range is 0.05 to 0.40, and most preferably from 0.1 to 0.3 microns in diameter on a weight average basis. The larger first grafted rubber particles and the smaller second grafted rubber particles are added in step (E) to give a bimodal distribution of large and small providing a good balance of impact strength and gloss for the ABS polyblend. The optimum bimodal distribution is to have from about 50 to 97% by weight of the total rubber phase as small second grafted diene rubber particles and the remainder up to 100% being the larger first grafted rubber particles.

The Second Grafted Diene Rubber

Emulsion polymerization is preferred over mass or suspension polymerization for polymerizing rubber monomers for the second grafted diene rubber since such will provide a small particle size distribution which is preferred for use in the present invention. Furthermore, emulsion polymerization of rubber monomers produces a latex which is useful as a base or starting point for subsequent emulsion polymerization and grafting of the monomers onto the preformed rubber in the preparation of the second grafted diene rubber whherein the rubber forms a substrate and the grafted monomers a superstrate.

The second grafted rubber may be prepared by polymerizing superstrate monomers in the presence of the preformed rubber substrate, generally in accordance with conventional emulsion grafted polymerization techniques. The preferred processes use an emulsion technique to obtain the particle size of not more than about 0.5 microns for the graft copolymer which is preferred for use in the practice of the present invention. In such graft polymerization, a preformed rubber substrate generally is dissolved or dispersed in the monomers, and this admixture is polymerized to combine chemically or graft a portion of the superstrate monomers upon the rubber substrate. Depending upon the ratio of monomers to rubber substrate and polymerization conditions, it is possible to regulate both the desired degree of grafting of the superstrate monomers onto the rubber substrate and the polymerization of ungrafted copolymer. The ratio of monomers to rubber charged to the graft polymerization reaction zone in a primary determinant of the superstrate:substrate ratio of the resultant graft copolymer, although conditions of polymerization, rubber chemistry and particle size, rates of monomer addition, chain transfer agents, etc., may also exert an effect.

A polymerization catalyst is generally included and the amount used is generally within the range of from about 0.001 to 3.0 weight percent, and preferably from about 0.005 to 0.5 weight percent of the total polymerizable material, the exact amount depending upon the monomers and the desired polymerization cycle.

As is well known, it is often desirable to incorporate molecular weight regulators such as mercaptans, halides and terpenes in relatively small percentages by weight, on the order of from about 0.01 to 2.5 percent by weight of the polymerizable material. In addition, it may be desirable to include relatively small amounts of antioxidants or stabilizers, such as the conventional alkylated phenols and the like, although these may be added during or after polymerization.

In the emulsion polymerization grafting process, the monomers and rubber substrate are emulsified in water by use of suitable emulsifying agents, such as fatty acid soaps, alkali metal or ammonium soaps of high molecular weight, alkali or alkaryl sulfates and sulfonates, mineral acid salts of long chain aliphatic amines, etc. Emulsifying agents which have proven particularly advantageous are ammonium oleate, sodium palmitate, sodium stearate, and other sodium soaps. Generally, the emulsifying agent is provided in amounts of from about 0.1 to 15 parts by weight per 100 parts by weight of the monomers, and water is provided in an amount of from about 1 to 4 parts per part of monomers, and even in larger ratios where greater dilution is desirable, all as those skilled in the art appreciate.

If desired, an aqueous latex formed in the emulsion polymerization of the rubber substrate may provide the aqueous medium onto which the monomers are grafted, with or without the addition of further emulsifying agents, water, and the like. However, the rubber may be dissolved in the monomers, and the mixture emulsified, or a latex thereof may be separately prepared. Various water soluble free radical polymerization initiators are conventionally used for emulsion polymerization of the rubber monomer, including conventional peroxy-and azo-catalysts, and the resulting latex may be used as the aqueous medium in which the graft copolymer monomers are admixed. In this manner, the catalyst for the rubber polymerization may function in whole or part as the catalyst for the graft polymerization. However, additional catalysts may be added at the time of graft polymerization.

Typical emulsion polymerization conditions involve temperatures in the range of from about 20° to 100°C. with agitation, and preferably an inert atmosphere. Pressures of from about 1 to 100 pounds per square inch may be employed, and monomers and/or additional catalysts may be added incrementally or continuously over a portion of the reaction cycle. Polymerization is preferably continued until substantially all, that is more than 90 percent, of the monomers have polymerized. The remaining monomers and other volatile components are then distilled away from the latex, preferably, which is then ready for further treatment.

Particle size of the emulsion latex graft particles may be varied by seeding, emulsifying agent concentration, agitation, rubber size variation through agglomeration prior to grafting, coagulation techniques, etc. Preferred agglomeration procedures are provided by Dalton's U.S. Pat. No. 3,558,541 and U.S. Pat. No. 3,551,370.

The particle size of the rubber has an effect upon the optimum grafting level for a graft copolymer. For example, a given weight percentage of smaller size rubber particles will provide considerably higher surface area for grafting than the equivalent weight of a larger size rubber particle. Accordingly, the density of grafting can be varied depending upon the size of the rubber particle. Generally, smaller graft polymer particles will tolerate a higher superstrate/substrate ratio than larger size particles.

Although the amount of polymeric superstrate grafted onto the rubber substrate may vary from as little as 10.0 parts by weight to 100.0 parts of substrate to as much as 250.0 per 100.0 parts and even higher, the preferred graft copolymers will generally have a superstrate to substrate ratio of about 20 to 200:100 and most desirably about 30 to 150:100. With graft ratios about 30 to 150:100; a highly desirable degree of improvement in various properties generally is obtained.

A certain amount of free copolymer is formed with the second grafted rubber to produce a composite polymer known as a graft copolymer. As in the case of the first grafted diene rubber the copolymer grafted and formed with the grafted rubber should have about the same monomer composition as the matrix phase to insure the compatibility of the grafted copolymer, with the matrix copolymer formed during the polymerization step (D). A suitable emulsion polymerization process that can be used for preparing grafted diene rubbers having varying amounts of superstrate copolymer to substrate diene rubber is disclosed in U.S. Pat. No. 3,509,238 to Aubrey et al. The second grafted diene rubber copolymers preferably comprise from about 10 to 90% by weight of diene rubber, most preferably from about 40 to 80% by weight of diene rubber.

The first and second grafted diene rubbers are dispersed in step (E) under the mixing action of step (C). The combined first and second grafted diene rubbers dispersed and present in the liquid phase is preferably from about 1–40% by weight and most preferably from about 5–30% by weight based on the liquid phase. The liquid phase is devolatilized to provide an ABS polyblend comprising about 2 to 80% by weight of said first and second grafted diene rubbers providing the ABS polyblend with a combined rubber substrate of said first and second grafted diene rubbers of from about 1 to 40% by weight and preferably from about 5 to 30% by weight based on the polyblend wherein said second grafted rubber comprises about 50 to 97% of the total weight of said first and second grafted rubbers.

The particle size of the second grafted diene rubber has a significant effect upon the gloss and physical properties of the product produced by the processes of this invention. Typically, the particle size of the second grafted diene rubber used in the practice of the present invention may be varied from a weight average particle size of about 0.01 microns to as large as about 0.5 microns, and preferably from about 0.05 to 0.40 microns, depending upon the ultimate properties desired for a given product. A most preferred rubber graft copolymer for use in the practice of this invention are graft copolymers having a weight average particle size of from about 0.1 to 0.3 microns for the second grafted rubber.

For emulsion polymerization processes, the rubber desirably has a significant degree of crosslinking. With respect to the graft copolymers, at least some degree of crosslinking is inherent during the graft polymerization process, and this desirably may be augmented through the addition of crosslinking agents or control of the polymerization conditions.

DEWATERING OF THE SECOND GRAFTED RUBBER LATEX

The latex containing the second grafted diene rubber can be coagulated, filtering off the rubber, followed by washing and drying to a crumb by conventional rubber latex dewatering methods. The crumb is then dispersed in the liquid phase in step (E) by the mixing action of step (C). The crumb is a loose agglomerate of cross-linked and grafted particles that are readily dispersed as discrete particles in the monomer phase of the liquid phase. Such crumb can be dispersed in said monomers composition separately up to about 40% by weight based on said monomers to form a slurry with the monomers that can be fed to the liquid phase readily by pumping. Preferably, the slurry monomer composition used comprises at least about 50% by weight of alkenyl nitrile monomers in combination with the monovinyl aromatic monomers. In the operation of the process the evaporated monomers from the reactor can be condensed, cooled and used as the slurry monomers keeping the material balance of the process in balance. If the monomers removed from the reactor for evaporative cooling are not sufficient in amounts or proportions of a particular monomer then the feed monomer charged in step (A) can be adjusted to balance monomer proportions by the amounts charged in step (A) or those slurry monomers charged with the second grafted diene rubber. For example, the monomers removed from the reactor can have a styrene/acrylonitrile monomer ratio of 30/70 which is an operable ratio for the monomers used in slurrying the second grafted diene rubber. The charged monomer composition is adjusted for this rich acrylonitrile proportion by adjusting and reducing the acrylonitrile proportion added to maintain monomer proportions in the reactor at a predetermined ratio desired to produce a matrix copolymer of a predetermined composition, e.g., 70/30 styrene acrylonitrile.

The conventional method of coagulating, filtering, washing and drying requires a multistate process with costly equipment and operations. A preferred method of dewatering is described herewith. The graft rubber copolymer latex containing the second grafted rubber is mixed with a mixed monomer and solvent extracted for the polymers. The mixing may be accomplished in any form and order of addition so long as the extractant and latex are thoroughly interdispersed. Preferably, such mixing should be accomplished by relatively low shear rates. The monomer and solvent mixture comprises at least one monoalkenyl aromatic or ethylenically unsaturated nitrile monomer and at least one saturated, i.e., no unsaturated carbon atoms, solvent for the monoalkenylaromatic/ethylenically unsaturated nitrile graft copolymer superstrate and ungrafted copolymer. The mixed extractant contains at least about 5 percent by weight of such saturated solvent based on the total weight of such solvent plus monomers. Furthermore, to insure good water separation the monomer-solvent mixture can contain not more than 50 percent by weight of the monoalkenylaromatic monomer such as styrene. The extractant nitrile-monomer-solvent mixture is used in an amount of from 20 to 200 parts of saturated solvent plus monomer per hundred parts of latex solids by weight. Hence, if a monoalkenylaromatic monomer such as styrene is present the total monomer-solvent mixture added to and mixed with the graft rubber latex can range from 20 to 400 parts per hundred parts of latex solids by weight.

The monoethylenically unsaturated monomers useful in the monomer-solvent mixture are of the two general classes described above. When a typical ABS resin wherein the matrix resin is comprised of an acrylonitrile-styrene copolymer is desired then the most preferred monomers in the mixture are styrene and acrylonitrile. However, other monoalkenylaromatic monomers can be used in whole or in part in place of styrene, such as alphamethyl styrene, alpha-ethyl styrene, vinyl naphthalene and the like. Likewise, other monomers can be used in whole or in part in place of acrylonitrile, such as methacrylonitrile, 2-butenenitrile, 3-butenenitrile and the like. These monomers if employed, in the monomer-solvent mixture will be present in the matrix resin as comonomers in the matrix copolymer. Since ABS resins are overwhelmingly composed of acrylonitrile-styrene copolymer matrices these monomers are the preferred ones of choice for use in the monomer-solvent mixture for extracting the graft rubber latices, and in this specification the present invention will be described in terms of styrene and acrylonitrile monomers. It is to be understood, however, that the above monomers can also be used if desired.

The saturated solvent used in the monomer-solvent mixture can be any such saturated solvent boiling between about 25° and 250°C. at atmospheric pressure and preferably between about 35° and 180°C. which is a solvent for the graft rubber copolymer superstrate. Preferably, such a solvent is both a good solvent for the styrene/acrylonitrile copolymer superstrate while at the same time a relatively poor solvent or non-solvent for the alkadiene rubber substrate. Saturated solvents for the graft copolymer superstrate meeting the above criteria include nitriles such as acetonitrile, propionitrile, butyronitrile, methoxy propionitrile, benzonitrile, isobutyronitrile, acetone, cyanohydrin and the like, ketones such as acetone, methyl ethyl ketone, methyl propyl ketone, methyl isobutylketone, cyclohexanone and the like, lower carboxylic esters such as methyl acetate, ethyl acetate, butyl acetate, Cellosolve acetate, and the like, formamides and acetamides such as dimethylformamide, diethylformamide, dimethylacetamide, and the like. The preferred saturated solvents are those selected from the nitriles and ketones detailed above, which represent the best balance of solvent and non-solvent properties respectively for the copolymer superstrate and alkadiene rubber substrate.

Dewatering is obtained when the monomer-solvent mixture contains at least 5 percent by weight of said mixture of at least one of the saturated SAN copolymer solvents. Preferably, such monomer-solvent mixture will contain from about 10 to about 40 percent by weight of such solvent. Most preferably, the solvent can range from about 20 to about 35 percent by weight.

Generally, when a considerable portion of the most preferred monomers are present in the monomer-solvent mixture used, the graft rubber particle in the latex will be coagulated immediately or upon thorough mixing of the latex with the monomer-solvent mixture. However, it is usually preferred to speed up and insure completeness of such coagulation of the latex. This can be accomplished by gentle heating of the latex and monomer-solvent mixture or preferably by the addition thereto of known latex coagulants. Such coagulants found suitable include acids such as formic acid, acetic acid, propionic acid, acrylic and methacrylic acid, sulfuric acid and hydrochloric acid, salts such as aluminum sulfate, aluminum nitrate, sodium chloride, calcium nitrate, magnesium sulfate, lead nitrate and lead acetate, and polyelectrolytes such as polyethylene oxide of high molecular weight, polyacrylic acid, polyacrylates and polymethacrylates, polymethylene glycols of high molecular weight such as polyethylene glycol 3,000 and the like as well as alginates and other natural polymers known as latex coagulants. The most preferred are those coagulants which are most completely removed upon separation and removal of the water from the latex.

The mixing of the monomer-solvent mixture and the graft rubber latex generally results in a rapid extraction of the graft rubber particles into the monomer-solvent mixture and an accompanying separation of the major proportion of the water present in the latex or added with any coagulant used. The use of a coagulant aids in achieving the most complete separation of this water into a separate phase. The graft rubber copolymer particles as well as any ungrafted SAN copolymer present in the latex is rapidly taken up into the monomer-solvent mixture phase wherein the graft rubber particles are present as a dispersion. In order to achieve rapid formation of the dispersed graft rubber in monomer-solvent mixture phase, an amount of monomer-mixture of from about 30 to 400 parts of monomer-solvent mixture per 100 parts of latex solids, or from 30 to 200 parts of the total of alkenenitrile monomer-saturated solvent mixture per 100 parts of latex solids, is used. Preferably, an amount of such monomer-solvent mixture from 50 to 300 parts when styrene is present, on from 50 to 150 parts of the acrylonitrile-saturated solvent mixture, per 100 parts of latex solids is employed. The mixing and extraction is generally carried out at ambient temperatures, but can be conducted at from about 0° to about 80°C.

After the extraction of the graft rubber and SAN copolymer present into the monomer-solvent organic phases and formation of a separate water phase this latter water phase is separated from the organic phase. This separation of dewatering step can be carried out by any convenient means including centrifuging, decanting, filtering, or the like. Preferably, for use in a continuous process the water separation is carried out by a mechanical means which exerts pressure on the pasty or semi-solid organic phase so as to separate the water most efficiently and completely. One such suitable means is the screw separator disclosed in the copending application of R. D. Holstead and C. E. Wyman, U.S. Ser. No. 323,470 filed Jan. 15, 1973. Other mechanical means of exerting pressure upon the pasty organic and water mass may also be employed to remove the separate water phase from the organic phase. Generally, by such means one is able to separate and remove from 60 to 90 percent of the water present in the latex mixed with the monomer-solvent mixture. The most complete removal of such water at this stage is desirable in order to decrease the amount which must be removed in later stages of the procoess such as polymerization or devolatilization.

The organic phase which results from the extraction of graft rubber copolymer and separation of the free water phase comprises a dispersion of graft rubber copolymer particles in the monomer-solvent mixture. This organic dispersion is in the form of a paste or semi-solid. It may also be described as psuedo-plastic. The organic phase resulting from the mixing and extracting step outlined above and comprising a dispersion of graft rubber particles in the mixture of monomer-solvent comprises, on a 100 weight percent basis, from about 30 to 70 weight percent of graft rubber copolymer, from about 0.1 to 20 weight percent of uncombined or ungrafted second copolymer of monovinylidene aromatic monomer and alkenylnitrile formed during the emulsion polymerization, from about 10 to 70 weight percent of the mixture of ethylenically unsaturated monomer and saturated solvent for the styrene/acrylonitrile superstrate and second copolymer and from about 0 to 40 weight percent of water. A distinct advantage of the dewatering described resides in the ability to control and predetermine the range of viscosity of such organic dispersion paste at a desired level by selection of specific saturated organic solvents and amounts thereof to be used in the monomer-solvent mixture. In general, it has been found desirable to produce an organic dispersion having a viscosity ranging from about 3,000 to 100,000 cps. For optimum dewatering in the screw separator described the dispersion desirably has a viscosity of 50,000 to 80,000 cps. Preferably, for further transfer and treatment such dispersion will have a viscosity of from about 15,000 to 50,000 cps, which can be realized by addition of monomers and/or solvent to the dewatered dispersion, as detailed below. An organic dispersion having a viscosity within the above range is easily and efficiently transferred by pumping with none of the attendant disadvantages of a very high viscosity material.

In the present invention, one prefers to disperse the organic dispersion containing the second grafted rubber continuously into the polymerizing liquid phase in step (E) under the mixing action of step (C). This can be accomplished by conventional pumping of the dispersion directly into the reactor and the liquid phase. Other modes of feeding the dispersion to the liquid phase can be used such as pumping the dispersion into the feed line for the charged monomers so that the dispersion is dispersed with the monomers into the liquid phase. Conventional in-line pipe mixing devices can be used to mix the monomers and the dispersion to insure uniformity before entering the liquid phase.

Grafted Rubber Analysis

The first grafted rubbers can be analyzed for graft and occlusions along with swelling index by the well known gel tests. The first grafted rubber interpolymer is dispersed in tetrahydrofuran (1g/10 ml) which dissolves the copolymer leaving the dispersed rubber as a gel phase. The rubber phase is separated from the dispersion by centrifuge as a gel and dried in a vacuum oven at 50°C. for 12 hours and weighed as a dry gel.

$$\% \text{ Dry Gel in Polyblend} = \frac{\text{weight of dry gel}}{\text{weight of polyblend}} \times 100$$

$$\% \text{ Graft and Occlusions in Rubber} = \frac{\% \text{ dry gel} - \% \text{ rubber}}{\text{Percent rubber}^*} \times 100$$

*Percent rubber determined by infra-red spectrochemical analysis of the dry gel $$\left. \begin{array}{l} \text{Parts by weight} \\ \text{of graft polymer} \\ \text{and occluded poly-} \\ \text{mer per unit weight} \\ \text{of rubber} \end{array} \right\} = \frac{\% \text{ dry gel} - \% \text{ rubber}}{\text{percent rubber}}$$

The swelling index of the rubber graft particles is determined by taking the dry gel above and dispersing it in tetrahydrofuran for 12 hours. The gel is separated by centrifuge and the supernatant toluene drained free. The wet gel is weighed and then dried in a vacuum oven for 12 hours at 50°C. and weighed.

$$\text{Swelling Index} = \frac{\text{weight of wet gel}}{\text{weight of dry gel}}$$

The swelling index of the first grafted rubber can range from 2 to 50 preferably from 5 to 20.

The second grafted rubber can be analyzed according to the disclosed procedures. However, the second grafted rubber does not have an occluded phase in the rubber particle as does the first grafted rubber, hence the analysis only determined the percent of grafted copolymer on the rubber. The swelling index of the second grafted diene rubber can range from 2 to 20, preferably 2 to 10.

The following examples are set forth to illustrate more clearly the principles and practice of this invention to one skilled in the art. They are not intended to be restrictive but merely illustrative of the invention herein described.

EMBODIMENTS

In the following examples the reaction zone is produced by using a mixer reactor of the type shown in FIG. 1. The mixer/reactor is not limited to this particular mixer and those skilled in the art recognize that variations of this type of mixer may be used if the particular type of mixing disclosed is provided.

EXAMPLE 1

The First Grafted Diene Rubber Preparation

Fourteen parts of a soluble butadiene rubber were dissolved in 26.0 parts of acrylonitrile and 60.0 parts styrene. There were added thereto 0.07 part of a mixture of tertbutyl peracetate, 0.05 part di-tert-butyl peroxide and stabilizers. The mixture was heated to 100° centigrade with stirring. Terpinolene was added as a chain transfer agent over a period of approximately five hours in an amount of about 0.1 part per hour for approximately 5 hours, at the end of which time an additional 0.4 part was added.

At 30.0 percent conversion of the monomers, the partially polymerized syrup was dispersed in 120.0 parts water to which was added 2.0 parts styrene and, as a suspending agent, 0.3 part of an interpolymer of 95.5 mol percent of acrylic acid and 4.5 mol percent of 2-ethylhexyl acrylate which has a specific viscosity of about 4.0 as determined in a 1.0 percent solution in water at 25° centigrade. The resulting suspension was stirred and heated to polymerize the remaining monomer, cooled, centrifuged, washed and dried to recover the graft copolymer in the form of small spherical beads.

The amount of graft and occluded copolymer in the rubber particles was found to be about 1.3 parts to 1.0 part of rubber and the particle size of the rubber was analyzed as a weight average particle size of about 1.2 microns. The graft copolymer formed had a rubber content of about 14% by weight. The swelling index of the rubber particles was about 10.

About 14.3 parts by weight of graft copolymer containing 14% by weight rubber dissolved in 14.3 parts by weight of the monomer composition having a ratio of styrene/acrylonitrile (S/AN) of 70/30 to provide a first grafted diene rubber dispersed in said monomer composition. The rubber moiety of the first grafted diene rubber is 7% by weight of said dispersion and is a feed stock for the first grafted diene rubber to be fed in step (E) to the reaction zone.

EXAMPLE 2

The Second Grafted Diene Rubber Preparation

Part A — Rubber Crumb

A 97/3 butadiene/acrylonitrile rubber latex having a rubber particle size of 0.20 microns is emulsion graft polymerized at 80°C. with 40 parts of a 75/25 styrene/acrylonitrile monomer mixture per 100 parts or rubber. After the reaction has reached about 96 conversion, a grafted rubber latex of 35% solids, 23.5% rubber by weight is obtained. The latex is coagulated using a 10% magnesium sulfate solution and the coagulant, washed and dried as grafted rubber crumb containing about 67% by weight rubber and 33% by weight SAN. The grafted rubber has about 30 parts by weight of graft per 100 parts of rubber, hence the rubber crumb is about 67% rubber, 20% grafted SAN and 13% free SAN.

Part B — Dewatering Procedure

The grafted rubber latex of Part A having 35% solids and 23.5% rubber is dewatered wherein 40 parts of the latex together with 2.2 parts of a 13.6% aqueous aluminum sulfate coagulant solution, 15.6 parts of acetonitrile and 9.4 parts of styrene monomer are charged to an agitated tank and stirred for 2–3 minutes. The solids are coagulated entering the organic phase rising to the surface and separating from the water phase. The bulk of the water phase is drained away giving an organic phase dispersion comprising:

|  | Parts | Weight Percent |  |
| --- | --- | --- | --- |
| Solids | 14.0 parts | 36.0 | (rubber and SAN) |
| Acetonitrile | 8.6 parts | 22.0 |  |
| Styrene | 9.4 parts | 24.2 |  |
| Water | 6.9 parts | 17.8 |  |
| Total | 38.9 lbs. | 100.0 |  |

The 36 weight percent of solids provides 24 weight percent rubber and 12 weight percent SAN to the organic dispersion.

Part C — Rubber Paste Dispersion

The grafted rubber latex of Part A was metered to a mechanical screw device, for separating an organic paste phase from the water phase, along with a coagulant solution, butyronitrile solvent and styrene and acrylonitrile monomers at the rate shown below. The device employed was the screw separator disclosed and illustrated in copending application, U.S. Ser. No. 323,470 of Holstead and Wyman.

|  |  | lbs./hr. |  |
| --- | --- | --- | --- |
| Latex | 18.0 |  |  |
| Butyronitrile | 1.8 | 25% | (solvent/monomer mix) |
| Styrene | 2.7 | 37.5% | (solvent/monomer mix) |
| Acrylonitrile | 2.7 | 37.5% | (solvent/monomer mix) |
| 4% Al$_2$(SO$_3$) Solution | 3.0 |  |  |

After separation of the water phase by the screw separator the organic paste dispersion delivered 4.12 lbs./hour of rubber and had the following composition in lbs./hr.

|  | lbs./hr. | Weight Percent |
| --- | --- | --- |
| Solids | 5.58 | 41.0 |
| Water | 1.83 | 13.2 |
| Butyronitrile | 1.60 | 11.4 |
| Styrene | 2.7 | 19.4 |
| Acrylonitrile | 2.1 | 15.0 |
| Total | 13.81 | 100.0 |

Rubber content was 4.12 lbs./hr. or about 30% of the organic paste dispersion.

EXAMPLE 3

Continuously charged with the aid of pumps at a temperature of about 60°F. into the upper half of the space of the reaction zone is a liquid monomer stream comprising on a 100 weight percent basis about 70.9 weight percent styrene at a feed rate of 156 pounds per hour and about 29.1 weight percent acrylonitrile at a feed rate of about 64 pounds per hour.

The reaction zone is maintained at about a 65 percent volumetric fillage level based on a substantially non-expanded liquid phase with a vapor phase thereabove composed of unreacted monomers. Paddle assembly is rotated on a horizontal axis at about 12 rpm which produces mixing action which maintains in the liquid phase a substantially uniform composition distribution.

After start up is completed and substantially steady state operating conditions are reached, the temperature in the reaction zone is maintained at about 280°F. with the pressure therein being about 35 psia. The jacket about the reaction zone is fluid filled and the fluid therein is maintained by heat exchange circulation at about 180°F.

A vaporized monomer composition at steady state conditions is continuously withdrawn at a total rate of about 20 pounds per hour from the vapor phase of the reaction zone at a rate sufficient to maintain the temperature in the reaction zone under substantially isothermal conditions at about 280°F. (as indicated above). The so-withdrawn monomer composition is collected and condensed but not returned to the reaction zone. Analysis of the condensate shows it to comprise about 30 weight percent styrene and about 70 weight percent acrylonitrile. The comosition of the vapor phase is found to be in substantial equilibrium with the composition of the liquid phase.

After steady state operating conditions are reached about 28.6 lbs./hr. of first grafted rubber copolymer dispersion of Example 1 is pumped continuously into the liquid phase of the reaction zone and dispersed. Said dispersion being about 7% rubber supplies about 2 lbs./hr. of rubber moiety of the liquid phase. Said rubber having about 2.6 lbs. of grafted and occluded SAN copolymer. The dispersion also supplies about 9.7 lbs./hr. of SAN copolymer to the liquid phase.

About 60 lbs./hr. of the second grafted rubber organic paste dispersion of Example 2, Part C is continuously pumped into the reaction zone and dispersed in the liquid phase. Said organic paste dispersion being about 30% rubber supplies about 18 lbs./hr. of rubber moiety to the liquid phase along with about 5.4 lbs./hr. of grafted SAN. The ratio of the second grafted rubber to first grafted rubber being 18 to 2 or 90 to 10 having 90 parts of small rubber particles to 10 parts of large rubber particles.

The liquid phase is continuously removed at steady state conditions from the bottom, central region of the reaction zone with the aid of a pump at a rate of about 200 pounds per hour which is sufficient to maintain the above-specified volume of fluid in the reaction zone.

The liquid phase removed from the reaction zone is passed continuously through two successive stages of wiped film devolatilization to remove the unreacted monomers and extruded into pellets of ABS polyblend. Physical tests on the ABS polyblend show the polyblend to have high gloss and toughness along with high elongation to fail and modulus providing an ABS polyblend of great utility. The ABS polyblend was analyzed and found to have about 13% by weight of first and second grafted rubber having a bimodal rubber size distribution of 90% small and 10% large particles; about 10% by weight graft polymer and about 77% by weight of SAN matrix graft copolymer. The SAN matrix copolymer comprises about 75% by weight of styrene and about 25% by weight of acrylonitrile and has an average molecular weight of about 360,000 having a dispersion index of about 2.9. The SAN matrix copolymer has a substantially constant molecular weight distribution and monomer composition and is pale yellow in color.

The liquid phase was found by analysis to contain substantially and completely dissolved about 54.5% by weight based on total liquid phase of the styrene/acrylonitrile matrix copolymer SAN with the balance up to 100% by weight comprising a mixture of unreacted styrene and acrylonitrile plus dispersed first and second grafted rubbers. The reaction zone thus is operating at about 55 conversion of monomers under steady state conditions and the rate at which the matrix copolymer was formed is at about 0.46 lbs. of matrix copolymer per pound of liquid phase per hour.

A steady state condition about 11.8% of the heat of reaction is removed from the reaction zone by the removal of the vapor from the vapor phase, about 61.4 percent of the heat of reaction is absorbed by the monomer being charged, and about 26.8 percent of the heat of reaction is removed by heat exchange through the well of the reaction zone. The viscosity of the liquid phase is estimated to be about 45,000 centipoises at 280°F. (130°C.) and at 10 sec.$^{-1}$.

EXAMPLE 4

Vapor Cooling and Removal

The equipment utilized in Example 1 is used again except that the operating scheme is altered. Here, about 132.75 pounds per hour of styrene, about 80.75 pounds per hour of acrylonitrile, and about 0.184 pounds per hour of terpinolene are charged to the reaction zone.

The reaction zone is maintained at about a 65 percent volumetric fillage level based on a substantially non-expanded liquid phase with a vapor phase thereabove composed of reacted monomers. The paddle assembly is rotated therein at about 12 rpm which produces mixing action which maintains in the liquid phase a substantially uniform composition distribution.

After start up is completed and substantially steady state operating conditions are reached, the temperature in the reaction zone is maintained at about 320°F. with the pressure therein being about 52 psia. The jacket about the reaction zone is fluid filled, and the fluid therein is maintained by heat exchange circulation at about 320°F. (Optionally, no fluid need be circulated in the jacket.)

After steady state operating conditions are reached at about 65% conversion on monomer providing about 100 lbs./hr. of matrix copolymer dissolved in the liquid phase, the first and second grafted rubbers were added as in Example 1 providing 2 lbs./hr. of the first grafted rubber moiety and 18 lbs./hr. of the second grafted moiety in the liquid phase providing 20 lbs./hr. of rubber along with 100 lbs./hr. of matrix copolymer in the liquid phase forming an ABS polyblend having about 20% rubber on devolatilization.

At steady state, vapor is removed at a rate of about 60 pounds per hour which comprises about 30 weight percent styrene and about 70 weight percent acrylonitrile. The composition of the vapor phase is found to be in substantial equilibrium with the composition of the liquid phase.

The liquid phase removed contains substantially completely dissolved therein about 65.4 weight percent styrene/acrylonitrile copolymer, with the balance up to 100 weight percent thereof comprising a mixture of unreacted styrene acrylonitrile monomers plus dispersed rubbers. The copolymer comprises about 75 weight percent styrene and about 25 weight percent acrylonitrile and has a weight average molecular weight of about 235,000, a dispersion index of about 2.7. This copolymer has a substantially uniform molecular weight distribution and a substantially uniform composition distribution. This copolymer is substantially without haze and is pale yellow in appearance.

The unreacted monomer composition comprises about 75 weight percent styrene and about 25 weight percent acrylonitrile. The rate of liquid phase removal from the reaction zone is about 153 pounds per hour. The viscosity of the liquid phase is estimated to be about 25,000 centipoises at 320°F. and at 10 sec.$^{-1}$. The rate at which this copolymer is formed from the monomer composition is about 0.55 pounds of copolymer per pound of liquid phase per hour.

At steady state conditions, about 28.3 percent of the heat of reaction is removed from the reaction zone by the removal of the vapor from the vapor phase, about 70.7 percent of the heat of reaction is absorbed by the monomer being charged, and about 1 percent of the heat of reaction is removed by heat exchange through the wall of the reaction zone.

The ABS polyblend obtained from the devolatilized liquid phase was tested and found to have excellent gloss and toughness along with impact strength, modulus and elongation at fail showing great utility as an ABS polyblend.

EXAMPLE 5

Vapor Cooling and Recycle

Continuously charged with the aid of pumps at a temperature of about 60°F. by spraying into the upper, central region of the reaction zone are styrene at the rate of about 114.75 lbs./hr., acrylonitrile at the rate of about 38.25 lbs./hr., and terpinolene at the rate of about 0.184 lbs./hr. Conditions like those of Example 2 are used.

A vaporized monomer composition at steady state conditions is continuously withdrawn from the vapor phase of the reaction zone at a rate sufficient to maintain the temperature in the reaction zone under substantially isothermal conditions at about 320°F. (as indicated above). The so-withdrawn monomer composition is collected and condensed and is returned to the reaction zone. The so-condensed vapor is collected and sub-cooled to about 60°F. before being returned to the reaction zone at a rate substantially equal to the vapor removal rate of about 60 pounds per hour. Analysis of the condensate shows it to comprise about 60 pounds per hour. Analysis of the condensate shows it to comprise about 30 weight percent styrene and about 70 weight percent acrylonitrile. The composition of the vapor phase is found to be in substantial equilibrium with the composition of the liquid phase.

After steady state operating conditions were reached at about 65% conversion of monomers as in Example 2, the first and second rubbers were dispersed in the same amounts as in Example 2 giving the same rubber concentration in the devolatilized ABS polyblend product providing a bimodal particle size distribution and excellent physical properties.

Continuously removed at steady state conditions from the bottom, central region of the reaction zone with the aid of a pump at a rate sufficient to maintain the above-specified volume of fluid in the reaction zone is the liquid phase which is found by analysis to contain substantially completely dissolved therein about 65.4 weight percent based on total liquid phase of a styrene/acrylonitrile copolymer with the balance up to 100 weight percent thereof comprising unreacted styrene and unreacted acrylonitrile monomers and dispersed rubbers. The copolymer comprises about 75 weight percent styrene and about 25 weight percent acrylonitrile and has a weight average molecular weight of about 235,000, a dispersion index of about 2.7, a substantially constant molecular weight distribution, and a substantially constant composition distribution. This copolymer is substantially without haze and is pale yellow in appearance. The unreacted monomer composition comprises about 75 weight percent styrene and about 25 weight percent acrylonitrile. The rate of liquid phase removal from the reaction zone is about 153 pounds per hour. The viscosity of the liquid phase is estimated to be about 25,000 centipoises at 320°F. and at 10 sec.$^{-1}$. The rate at which this copolymer is formed from the monomer composition is about 0.55 pounds of copolymer per pound of liquid phase per hour.

At steady state conditions, about 28.3 percent of the heat of reaction is removed from the reaction zone by the removal of the vapor from the vapor phase, about 70.7 percent of the heat of reaction is absorbed by the monomer being charged, and about 1 percent of the heat of reaction is removed by heat exchange through the wall of the reaction zone.

EXAMPLE 6

REFLUX COOLING

The procedures of Example 3 were repeated except here the vapor is removed from the reaction zone and returned thereto after condensation but without sub-cooling using a "knock-back" type reflux condenser. The heat balance in the reaction zone being shifted with (1) vapor removal, (2) materials charged and (3) the jacket removing 48.6%, 48.0% and 3.4% respectively as compared to Example 5 at 28.3%, 70.7% and 1% respectively showing a shift of heat load to vapor removal from materials charged.

EXAMPLE 7

Molecular Weight Control

Example 4 was substantially repeated except that the terpinolene molecular weight modifier was increased from 0.184 lbs./hr. to 1.498 lbs./hr. The matrix copolymer was found to have a weight average molecular weight of about 140,000 compared to 235,000 in Example 4. The dispersion index was 2.6 showing a narrow molecular weight distribution for the matrix copolymer of the ABS polyblend. It is evident that the weight average molecular weight of the matrix copolymer can be varied readily and over a wide range within the process limits yet the molecular weight distribution or dispersion index can be controlled in a narrow range giving ABS polyblends with predetermined molecular weights having great utility.

EXAMPLE 8

Rubber Particle Size Variations

Example 2 was repeated using a rubber having a weight average particle size diameter of about 0.31 microns giving a second grafted diene rubber having a weight average particle size diameter of about 0.31 microns. Example 8 was run as Example 3 using the second grafted rubber above having a weight particle size of 0.31. Analysis of the ABS polyblend showed the polyblend to have higher toughness but lower gloss than that of Example 3 consistent with a larger rubber particle size for both the first and second grafted rubbers. It is evident that the rubber particle size may be varied within the limits of the process providing ABS polyblends of high utility having a predetermined bimodal rubber particle size.

What is claimed is:

1. A continuous mass polymerization process for the preparation of an ABS type polyblend, the steps comprising:

A. continuously charging a monomer composition comprising at least one alkenyl nitrile monomer of the formula:

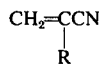

wherein R is selected from the group consisting of hydrogen and alkyl radicals containing from 1 through 4 carbon atoms each and at least one monoalkenyl aromatic monomer of the formula:

wherein:
   Ar is selected from the group consisting of a phenyl radical, an alkaryl radical of 6 through 9 carbon atoms, a monochlorophenyl radical, a dichlorophenyl radical, a monobromophenyl radical, and a dibromophenyl radical, and
   X is selected from the group consisting of hydrogen and an alkyl radical containing less than three carbon atoms to a reaction zone, B. continuously maintaining in said reaction zone a reaction system comprising a liquid phase of said monomers with a vapor phase of said monomers generally thereabove,
   1. said liquid phase filling said reaction zone to an extent of from about 10 to 95 percent by volume and comprising said monomer composition,
   2. said vapor phase filling the balance up to 100 percent by volume of said reaction zone, the exact composition of said vapor phase being in substantial equilibrium with the exact composition of said liquid phase, C. continuously subjecting said reaction system in said reaction zone to mixing action sufficient to maintain a substantially uniform composition distribution throughout said liquid phase in said reaction zone, D. continuously mass polymerizing said monomers at a temperature from about 100° to 180°C. and a pressure of from about 5 to 150 psia forming a matrix copolymer dissolved in said liquid phase, while simultaneously and, E. continuously dispersing uniformly a first and second grafted diene rubber into said liquid phase under the mixing action of step (C), and during the polymerization of step (D), said first grafted diene rubber being dispersed as rubber particles having a weight average particle size of about 0.7 to 10 microns, a swelling index of at least about 5 and having present occluded and grafted copolymer in an amount of from about 1 to 5 parts per part of rubber, said second grafted diene rubber being dispersed as rubber particles having a weight average particle size of about 0.1 to 0.5 microns, a swelling index of at least about 2 and being grafted with about 0.1 to 2.5 parts of copolymer per part of rubber, said second grafted rubber comprising from about 70 to 97% of the total weight of said first and second grafted diene rubbers dispersed providing a bimodal particle size distribution of said first and second grafted rubber particles in said liquid phase, F. continuously removing said vapor phase from said reaction zone at a rate sufficient to maintain, in combination with any heat of reaction being absorbed in said reaction zone by said charging of monomers and with any heat of reaction being removed from said reaction zone through the peripheral boundaries thereof, in said reaction zone a substantially constant temperature and a corresponding substantially constant pressure within the respective temperature and pressure ranges above specified, G. continuously removing said liquid phase from said reaction zone at a rate sufficient to maintain the above specified volume of said liquid phase, H. continuously separating said matrix copolymer and said first and second grafted rubbers from said liquid phase removed in step (G) as an ABS polyblend, I. said charging additionally being conducted:
   1. at a rate substantially equal to the total rate at which monomers are polymerized in said reaction zone, and removed from said reaction zone, and
   2. in a ratio of total alkenyl nitrile monomers to total monoalkenyl aromatic monomers such that both a substantially constant said monomer composition is effectively maintained in said liquid phase in said reaction zone and in said matrix copolymer formed from said monomer composition, J. the interrelationship between said charging, said liquid phase removal, and said substantially constant temperature and corresponding substantially constant pressure in said reaction zone being such that:
   a. the weight percentage of said matrix copolymer in said liquid phase in said reaction zone is maintained at a substantially predetermined constant value,
   b. the rate at which said matrix copolymer is formed from said monomer composition in said reaction zone ranges from about 0.05 to 2.0 pounds of said matrix copolymer produced per pound of said liquid phase per hour.

K. the interrelationship in said reaction zone between said mixing action and said vapor phase removal being such that said reaction system is maintained under substantially isothermal conditions, L. the interrelationship between said charging, said vapor phase removal, and said reaction zone being such that:
   1. at least about 10 percent of the heat of reaction is removed from said reaction zone by said vapor phase removal, 2. up to about 90 percent of the heat of reaction is absorbed by said charging, and
3. up to about 50 percent of the heat of reaction is removed through the peripheral boundaries of said reaction zone through heat transfer.

2. A process of claim 1, wherein said monoalkenyl aromatic monomer and said alkenyl nitrile monomer comprise at least about 75% by weight of said monomer composition.

3. A process of claim 1, wherein said monomer composition comprises from about 1 to 99% by weight of an alkenyl nitrile monomer and from about 1 to 99% by weight of a monoalkenyl aromatic monomer.

4. A process of claim 1, wherein said monoalkenyl aromatic monomer is styrene.

5. A process of claim 1, wherein said alkenyl aromatic monomer is acrylonitrile.

6. A process of claim 1, wherein said monoalkenyl aromatic monomer is styrene, and said alkenyl nitrile monomer is acrylonitrile.

7. A process of claim 1, wherein said monoalkenyl aromatic monomer is alpha-methylstyrene.

8. A process of claim 1, wherein said alkenyl nitrile monomer is methacrylonitrile.

9. The process of claim 1, wherein said vapor phase so removed is condensed and returned to said reaction zone as a portion of monomers so charged thereto.

10. The process of claim 1, wherein the weight percentage of said matrix copolymer formed in said liquid phase is at least about 35.

11. The process of claim 1, wherein the weight percentage of said matrix copolymer in said liquid phase ranges from about 35 to 80.

12. The process of claim 1, wherein the rate of conversion of monomers to matrix copolymer ranges from about 0.1 to 1.0 pounds of matrix copolymer produced per pound of said liquid phase per hour.

13. The process of claim 1, wherein the viscosity of said liquid phase ranges from about 50,000 to 250,000 centipoises at said constant temperature and at 10 sec.$^{-1}$ shear rate.

14. The process of claim 1, wherein additionally from about 0.01 to 2 weight percent of a chain transfer agent, based on total monomer composition charged, is continuously charged to said reaction zone.

15. The process of claim 14, wherein said chain transfer agent is terpinolene.

16. The process of claim 1, wherein additionally from about 0.01 to 15 weight percent based on total monomer composition charged of a solvent liquid is charged to said reaction zone at a rate sufficient to keep the quantity of said solvent liquid in said reaction zone at a substantially constant value.

17. The process of claim 16, wherein said solvent liquid is ethyl benzene and the copolymer product contains less than about 50 weight percent alkenyl nitrile compound.

18. The process of claim 16, wherein said solvent lqiuid is methyl ethyl ketone and the matrix copolymer product contains less than about 50 weight percent monoalkenyl aromatic compound.

19. The process of claim 1, wherein the relationship between said charging, said vapor phase removal and said reaction zone being such that:
1. from about 25 to 85 percent of the heat of reaction is removed from said reaction zone by said vapor phase removal,
2. from about 15 to 75 percent of the heat of reaction is absorbed by said charging, and
3. from about minus 10 to 10 percent of the heat of reaction is removed through the peripheral boundaries of said reaction zone through heat transfer.

20. The process of claim 19, wherein the relationship between said charging and said vapor phase removal is such that about one-third of the heat of reaction is removed by said vapor phase removal and about the remaining two-thirds of said heat of reaction is removed by said charging.

21. The process of claim 1, wherein additionally from about 0.005 to 1 weight percent of a polymerization initiator, baased on total monomer composition charged, is continuously charged to said reaction zone.

22. The process of claim 21, wherein said initiator is detertiary butyl peroxide.

23. The process of claim 1, wherein the ABS polyblend produced comprises a matrix copolymer of styrene and acrylonitrile monomers and a first and second grafted diene rubber grafted with styrene and acrylonitrile.

24. The process of claim 23, wherein said matrix copolymer comprises from about 5 to 85 weight percent acrylonitrile and from about 15 to 95 weight percent styrene.

25. The process of claim 1, wherein the ABS polyblend produced comprises a matrix copolymer of styrene and methacrylonitrile monomers and first and second grafted diene rubber grafted with styrene and methacrylonitrile.

26. The process of claim 25, wherein said matrix copolymer comprises on a 100 weight percent basis from about 60 to 95 weight percent methacrylonitrile, and, correspondingly, from about 5 to 40 weight percent styrene.

27. The process of claim 1, wherein the matrix copolymer produced comprises a copolymer of from about 5 to 40 weight percent styrene, from about 40 to 70 weight percent acrylonitrile, and from about 5 to 30 weight percent methacrylonitrile on a 100 total weight percent basis.

28. The process of claim 1, wherein the ABS polyblend produced is separated from said liquid phase using at least one stage of wiped film devolatilization in step (H).

29. The process of claim 1, wherein said mixing action is produced by subjecting said liquid phase in said reaction zone simultaneously to a combination of:
1. cyclical vertical displacement in said zone such that at a cycle rate in the range from about one-half to 60 times per minute,
   a. first, said liquid phase is subjected to a vertical lifting force greater than that exerted downwardly thereon by gravity, and at least sufficient to move vertically at least about 10 percent of the total volume of said fluid from a gravitationally lower region to a gravitationally higher region in said zone, and
   b. secondly, such so displaced liquid phase is subjected to a gravitational falling force by effective removal of said lifting force therefrom, the total gravitational falling force applied thereon being at least sufficient to return substantially all of such so displaced liquid phase to said gravitationally lower region before said cycle is repeated on such so displaced liquid, 2. rolling action in a generally peripherally located and generally horizontally extending region in said zone, said region extending circumferentially about the entire internal periphery of said zone, said region being continuously moving in a direction which is generally normal to the horizontal, said rolling action being produced by a similarly so moving band of pressure located adjacent to, but following behind, said region, said band of pressure exerting a force on said liquid phase in said region at least sufficient to cause movement of a portion of said liquid phase in said region along a roughly cross-sectionally circular path normally away from the adjacent internal periphery of said zone adjacent to said band of pressure towards the interior of said zone a distance which is generally less than the maximum distance across said zone at a given peripheral position and then back towards said internal periphery forwardly of said band of pressure before moving towards said band of pressure, there being a shear rate between said internal periphery and said zone of pressure of at least about 5 sec.$^{-1}$, 3. horizontal displacement in said zone in a longitudinal circulatory manner at a cycle rate such that the actual volume of said liquid phase moved from one end region of said treating zone to the opposite end region thereof and back within one minute is equivalent to from about one-tenth to 30 times the total volume of said liquid phase in said zone, such equivalent volume and the horizontal circulation rate for such liquid phase so moved, respectively, being approximately proportional to said cyclical vertical displacement cycle rate in any given instance, while continuously maintaining substantially the total volume of said liquid phase in said zone under laminar flow conditions.

30. A process of claim 1, wherein said first grafted diene rubber is dispersed in said liquid phase as crosslinked rubber particles having an average particle size of 0.7 to 10 microns, a swelling index of at least 5 and having present occluded and grafted copolymer in an amount of about 1 to 5 parts per each part of rubber, said second grafted diene rubber being dispersed as crosslinked rubber particles having an average particle size of 0.01 to 0.5 microns, a swelling index of at least 2 and being grafted with about 0.1 to 2.5 parts of said copolymer per 1 part of rubber, said first and second grafted rubbers being dispersed in said liquid phase in an amount of from about 1 to 40 weight percent based on said liquid phase wherein said second grafted rubber comprises about 50 to 97% of the total weight of said first and second grafted rubbers.

31. A process of claim 1, wherein said diene rubber of said first and second grafted diene rubber is butadiene, butadiene-styrene, butadiene-acrylonitrile, butadiene-styrene-acrylonitrile, chloroprene, chloroprene-butadiene, chloroprene-styrene, chloroprene-acrylonitrile, chloroprene-styrene-acrylonitrile and mixtures thereof.

32. A process of claim 1, wherein the diene rubber of said first and second grafted rubber contains at least 50% by weight of a conjugated 1,3 butadiene monomer moiety.

33. A process of claim 1, wherein said diene rubber of said first grafted rubber is polybutadiene having a cis isomer content of about 30 to 98% and a Tg range of from about −50°C. to −105°C.

34. A process of claim 1, wherein the first grafted diene rubber dispersed in step (E) is contained in a dispersion comprising said monomer composition having dispersed therein from about 0.1 to 15% by weight of said first grafted rubber.

35. A process of claim 1, wherein the second grafted diene rubber dispersed in step (E) is contained in a dispersion comprising said monomer composition having dispersed therein from about 1 to 40% by weight of said second grafted rubber.

36. A process of claim 1, wherein the first grafted rubber has occluded and grafted copolymers of substantially the same monomer composition as the matrix copolymer of the ABS polyblend and the second grafted rubber has grafted copolymer of substantially the same monomer composition as the matrix copolymer of the ABS polyblend.

37. A process of claim 1, wherein the second grafted diene rubber dispersed in step (E) is contained in a monomersolvent mixture comprising on an 100 weight percent basis, from about 30–60 weight percent of said second grafted diene rubber, about 0.1 to 20 weight percent of a copolymer of said monomers, about 20 to 70 weight percent of said monomers and a saturated solvent and from about 0 to 40 weight percent of water.

38. A process of claim 1, wherein separation step (H) produces an ABS polyblend comprising about 2 to 80% by weight of said first and second grafted diene rubber wherein said second grafted diene rubber comprises about 70 to 97% of the total weight of said first and second grafted diene rubbers, the remainder up to 100% by weight comprising matrix copolymers of said monomers, said first and second grafted diene rubbers being dispersed in said ABS polyblend as rubber particles having a bimodal particle size distribution wherein said first grafted diene rubber particles being crosslinked, having an average particle size of about 0.7 to 10 microns, a swelling index of at least about 5 and having present occluded and grafted copolymer in an amount of about 1 to 5 parts per each part of rubber, said second diene rubber particles being crosslinked, having an average particle size of about 0.1 to 0.5 microns, a swelling index of at least 2 and being grafted with about 0.1 to 2.5 parts of copolymer per each part of rubber.

* * * * *